(12) United States Patent
Seyed Mousavi et al.

(10) Patent No.: US 11,907,475 B2
(45) Date of Patent: Feb. 20, 2024

(54) SYSTEM AND MACHINE LEARNING METHOD FOR LOCALIZATION OF AN INPUT DEVICE RELATIVE TO A TOUCH SENSITIVE SURFACE

(71) Applicant: Apple Inc., Cupertino, CA (US)

(72) Inventors: Hojjat Seyed Mousavi, Santa Clara, CA (US); Behrooz Shahsavari, Hayward, CA (US); Bongsoo Suh, San Jose, CA (US); Utkarsh Gaur, Millbrae, CA (US); Nima Ferdosi, San Jose, CA (US); Baboo V. Gowreesunker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,866

(22) Filed: Sep. 24, 2021

(65) Prior Publication Data

US 2022/0100341 A1    Mar. 31, 2022

Related U.S. Application Data

(60) Provisional application No. 63/083,729, filed on Sep. 25, 2020.

(51) Int. Cl.
*G06F 3/041* (2006.01)
*G06F 3/0354* (2013.01)
(Continued)

(52) U.S. Cl.
CPC ........ *G06F 3/0418* (2013.01); *G06F 3/03545* (2013.01); *G06F 3/0446* (2019.05);
(Continued)

(58) Field of Classification Search
CPC .............. G06F 3/0418; G06F 3/03545; G06F 3/04162; G06F 3/04166; G06F 3/0446;
(Continued)

(56) References Cited

U.S. PATENT DOCUMENTS 5,414,227 A   5/1995   Schubert et al.
7,567,414 B2  7/2009   Bertin et al.
(Continued)

FOREIGN PATENT DOCUMENTS

CN    107368203 A    11/2017
EP     2466431 A1     6/2012
(Continued)

OTHER PUBLICATIONS

Advisory Action received for U.S. Appl. No. 14/848,289, dated Sep. 25, 2018, 3 pages.
(Continued)

*Primary Examiner* — Benyam Ketema
(74) *Attorney, Agent, or Firm* — Kubota & Basol LLP

(57) ABSTRACT

In some examples, an electronic device can use machine learning techniques, such as convolutional neural networks, to estimate the distance between a stylus tip and a touch sensitive surface (e.g., stylus z-height). A subset of stylus data sensed at electrodes closest to the location of the stylus at the touch sensitive surface including data having multiple phases and frequencies can be provided to the machine learning algorithm. The estimated stylus z-height can be compared to one or more thresholds to determine whether or not the stylus is in contact with the touch sensitive surface. In some examples, the electronic device can use machine learning techniques to estimate the (x, y) position and/or tilt and/or azimuth angles of the stylus tip at the touch sensitive surface based on a subset of stylus data.

21 Claims, 11 Drawing Sheets

(51) Int. Cl.
  *G06N 3/04* (2023.01)
  *G06F 3/044* (2006.01)
  *G06N 20/20* (2019.01)
  *G06F 18/214* (2023.01)
(52) U.S. Cl.
  CPC ...... *G06F 3/04162* (2019.05); *G06F 3/04166* (2019.05); *G06F 18/214* (2023.01); *G06N 3/04* (2013.01); *G06N 20/20* (2019.01); *G06F 3/0442* (2019.05); *G06F 2203/04101* (2013.01)
(58) Field of Classification Search
  CPC ........ G06F 3/0442; G06F 2203/04101; G06K 9/6256; G06N 3/04; G06N 20/20; G06N 3/0454; G06N 3/08; G06V 10/82
  See application file for complete search history.

(56) References Cited

U.S. PATENT DOCUMENTS

| | | | |
|---|---|---|---|
| 8,199,132 B1* | 6/2012 | Oda | G06F 3/0441 178/19.06 |
| 8,493,359 B2 | 7/2013 | Wright et al. | |
| 8,547,114 B2* | 10/2013 | Kremin | H03M 11/02 324/678 |
| 8,587,535 B2* | 11/2013 | Oda | G06F 3/04166 345/173 |
| 8,657,814 B2 | 2/2014 | Werneth et al. | |
| 8,773,405 B1 | 7/2014 | Ryshtun et al. | |
| 8,816,985 B1* | 8/2014 | Tate | G06F 3/041661 345/173 |
| 8,854,147 B2 | 10/2014 | Lin | |
| 9,018,547 B2* | 4/2015 | Rimon | G06F 3/038 345/173 |
| 9,117,677 B2 | 8/2015 | Ma et al. | |
| 9,189,088 B2 | 11/2015 | Tsao et al. | |
| 9,201,547 B2* | 12/2015 | Elias | G06F 3/0418 |
| 9,310,943 B1* | 4/2016 | Omelchuk | G06F 3/0442 |
| 9,383,835 B2 | 7/2016 | Lo et al. | |
| 9,594,440 B2 | 3/2017 | Park et al. | |
| 9,606,680 B1 | 3/2017 | Sundara-Rajan | |
| 9,612,671 B1 | 4/2017 | Blaszczak et al. | |
| 9,665,184 B2* | 5/2017 | Hara | G06F 1/3296 |
| 10,558,293 B2 | 2/2020 | Wigdor et al. | |
| 11,079,862 B2 | 8/2021 | Brunet et al. | |
| 11,079,888 B1* | 8/2021 | Gray | G06F 3/016 |
| 11,287,926 B1* | 3/2022 | Shahsavari | G06K 9/6256 |
| 2007/0195068 A1 | 8/2007 | Kable et al. | |
| 2008/0156546 A1 | 7/2008 | Hauck | |
| 2009/0008162 A1 | 1/2009 | Yang et al. | |
| 2009/0273579 A1* | 11/2009 | Zachut | G06F 3/0446 345/174 |
| 2009/0289922 A1 | 11/2009 | Henry | |
| 2010/0117661 A1 | 5/2010 | Bruwer et al. | |
| 2010/0315384 A1 | 12/2010 | Hargreaves et al. | |
| 2011/0063154 A1* | 3/2011 | Hotelling | H03M 3/494 341/143 |
| 2011/0297458 A1 | 12/2011 | Mao et al. | |
| 2012/0007608 A1 | 1/2012 | Hadwen et al. | |
| 2012/0146960 A1 | 6/2012 | Shih et al. | |
| 2012/0154340 A1 | 6/2012 | Vuppu et al. | |
| 2012/0268428 A1 | 10/2012 | Nakata et al. | |
| 2012/0278031 A1* | 11/2012 | Oda | G06F 3/045 702/150 |
| 2012/0327042 A1 | 12/2012 | Harley et al. | |
| 2012/0331546 A1 | 12/2012 | Falkenburg et al. | |
| 2013/0088465 A1 | 4/2013 | Geller et al. | |
| 2013/0106718 A1 | 5/2013 | Sundara-Rajan | |
| 2013/0141397 A1 | 6/2013 | Dunagan | |
| 2013/0194225 A1 | 8/2013 | Shen et al. | |
| 2013/0285900 A1 | 10/2013 | Liu | |
| 2014/0146009 A1* | 5/2014 | Huang | G06F 3/0446 345/174 |
| 2015/0091856 A1* | 4/2015 | Park | G06F 3/0446 345/174 |
| 2015/0123923 A1 | 5/2015 | Stern | |
| 2015/0123932 A1 | 5/2015 | Collins | |
| 2015/0138164 A1 | 5/2015 | Hinson | |
| 2015/0160744 A1 | 6/2015 | Mohindra et al. | |
| 2015/0193024 A1* | 7/2015 | Kai | G06F 3/0383 345/179 |
| 2015/0277618 A1 | 10/2015 | Bulea | |
| 2015/0309598 A1 | 10/2015 | Zeliff et al. | |
| 2015/0355732 A1 | 12/2015 | Mann | |
| 2016/0048224 A1* | 2/2016 | Brunet | G06F 3/0442 345/174 |
| 2016/0162045 A1 | 6/2016 | Vincent | |
| 2016/0179271 A1* | 6/2016 | Vandermeijden | G06F 3/04162 345/174 |
| 2016/0266663 A1 | 9/2016 | Holsen | |
| 2016/0313825 A1 | 10/2016 | Hotelling et al. | |
| 2016/0320913 A1 | 11/2016 | Gao et al. | |
| 2017/0010697 A1 | 1/2017 | Jiang et al. | |
| 2017/0068344 A1 | 3/2017 | Bhandari et al. | |
| 2017/0075441 A1 | 3/2017 | Leigh et al. | |
| 2017/0075446 A1 | 3/2017 | Vandermeijden | |
| 2017/0212635 A1* | 7/2017 | Cordeiro | G06F 3/04182 |
| 2017/0262076 A1* | 9/2017 | Hara | G06F 3/0442 |
| 2017/0262100 A1* | 9/2017 | Leigh | G02F 1/13338 |
| 2017/0285772 A1* | 10/2017 | Yamamoto | G06F 3/04162 |
| 2017/0308189 A1 | 10/2017 | Peretz et al. | |
| 2017/0344174 A1* | 11/2017 | Pant | G06F 3/041661 |
| 2018/0181245 A1* | 6/2018 | Beck | G06F 3/04883 |
| 2018/0246585 A1* | 8/2018 | Hara | G06F 3/0416 |
| 2018/0284909 A1 | 10/2018 | Laslo et al. | |
| 2018/0309190 A1 | 10/2018 | Niakan | |
| 2018/0338065 A1 | 11/2018 | Zyskind et al. | |
| 2019/0155408 A1 | 5/2019 | Hou et al. | |
| 2019/0155411 A1 | 5/2019 | Kinrot et al. | |
| 2019/0220187 A1* | 7/2019 | Budd | G06F 3/0486 |
| 2019/0324564 A1 | 10/2019 | Brunet et al. | |
| 2019/0371787 A1 | 12/2019 | Mandal | |
| 2020/0019257 A1 | 1/2020 | Chang et al. | |
| 2020/0159386 A1* | 5/2020 | Saito | G06F 3/0446 |
| 2020/0192521 A1* | 6/2020 | Case, Jr. | G06F 3/04186 |
| 2020/0201505 A1* | 6/2020 | Jung | G06F 3/0414 |
| 2020/0218322 A1* | 7/2020 | Gray | G06F 1/28 |
| 2021/0026464 A1 | 1/2021 | Yamada et al. | |
| 2021/0232240 A1 | 7/2021 | Smith | |
| 2021/0240325 A1 | 8/2021 | Smith | |
| 2021/0255735 A1* | 8/2021 | Gray | G06F 3/016 |
| 2021/0286493 A1 | 9/2021 | Wang et al. | |
| 2021/0303151 A1* | 9/2021 | Morrison | G06F 3/04166 |
| 2021/0303152 A1* | 9/2021 | Hosur | G06F 3/044 |
| 2021/0325444 A1 | 10/2021 | Chong | |
| 2022/0091685 A1 | 3/2022 | Bechstein et al. | |
| 2022/0095443 A1 | 3/2022 | Bechstein et al. | |
| 2022/0100310 A1 | 3/2022 | Shahsavari et al. | |
| 2022/0334658 A1* | 10/2022 | Dekel | G06F 1/32 |

FOREIGN PATENT DOCUMENTS

| | | |
|---|---|---|
| EP | 2624104 A2 | 8/2013 |
| EP | 2672494 A1 | 12/2013 |
| EP | 2813918 A1 | 12/2014 |
| EP | 2624104 A3 | 3/2016 |
| EP | 3326050 A1 | 5/2018 |
| WO | 2017/044428 A1 | 3/2017 |
| WO | 2019036857 A1 | 2/2019 |
| WO | 2020/023640 A1 | 1/2020 |
| WO | 2020/027818 A1 | 2/2020 |

OTHER PUBLICATIONS

Final Office Action received for U.S. Appl. No. 14/848,289, dated Jun. 21, 2018, 11 pages.
International Search Report received for PCT Patent Application No. PCT/US2016/048590, dated Feb. 7, 2017, 6 pages.
International Search Report received for PCT Patent Application No. PCT/US2016/048630, dated Nov. 18, 2016, 3 pages.
Non Final Office Action received for U.S. Appl. No. 14/848,277, dated Nov. 18, 2016, 18 Pages.

(56) References Cited

OTHER PUBLICATIONS

Non Final Office Action received for U.S. Appl. No. 14/848,277, dated Sep. 19, 2017, 11 pages.
Non-Final Office Action received for U.S. Appl. No. 14/848,289, dated Nov. 3, 2017, 18 pages.
Non-Final Office Action received for U.S. Appl. No. 14/848,289, dated Nov. 17, 2016, 11 pages.
Non-Final Office Action received for U.S. Appl. No. 16/836,789, dated Oct. 1, 2021, 27 pages.
Non-Final Office Action received for U.S. Appl. No. 17/031,570, dated Dec. 17, 2021, 11 pages.
Non-Final Office Action received for U.S. Appl. No. 17/031,549, dated Oct. 20, 2021, 13 pages.
Non-Final Office Action received for U.S. Appl. No. 17/031,549, dated Sep. 29, 2021, 14 pages.
Notice of Allowance received for U.S. Appl. No. 14/848,277, dated May 8, 2018, 5 Pages.
Notice of Allowance received for U.S. Appl. No. 14/848,289, dated Nov. 21, 2018, 6 pages.
Notice of Allowance received for U.S. Appl. No. 16/836,789, dated Feb. 18, 2022, 9 pages.
Notice of Allowance received for U.S. Appl. No. 17/031,549, dated Feb. 1, 2022, 8 pages.
Notice of Allowance received for U.S. Appl. No. 17/161,499, dated Aug. 12, 2021, 9 pages.
Notice of Allowance received for U.S. Appl. No. 17/161,499, dated Dec. 1, 2021, 8 pages.
Final Office Action received for U.S. Appl. No. 17/031,570, dated May 13, 2022, 12 Pages.
International Preliminary Report on Patentability received for PCT Patent Application No. PCT/US2016/048590, dated Mar. 22, 2018, 17 pages.
Notice of Allowance received for U.S. Appl. No. 16/836,789, dated May 25, 2022, 8 Pages.
Notice of Allowance received for U.S. Appl. No. 17/031,549, dated May 6, 2022, 8 pages.
Notice of Allowance received for U.S. Appl. No. 17/448,774, dated May 4, 2022, 10 pages.
Written Opinion received for PCT Patent Application No. PCT/US2016/048590, dated Feb. 7, 2017, 15 pages.
Non-Final Office Action received for U.S. Appl. No. 17/031,570, dated Dec. 12, 2022, 11 pages.
Final Office Action received for U.S. Appl. No. 17/031,570, dated Mar. 30, 2023, 12 pages.

\* cited by examiner

SYSTEM AND MACHINE LEARNING METHOD FOR LOCALIZATION OF AN INPUT DEVICE RELATIVE TO A TOUCH SENSITIVE SURFACE

CROSS-REFERENCE TO RELATED APPLICATION

This application claims the benefit of U.S. Provisional Application No. 63/083,729, filed Sep. 25, 2020, which is hereby incorporated by reference in its entirety for all purposes.

FIELD

This relates to a processing input device data and, more particularly, to a system and method for estimating the distance of an input device from a touch sensitive surface and/or the position of the input device relative to the touch sensitive surface and/or tilt and azimuth of the input device relative to touch sensitive surface when processing input device data.

BACKGROUND

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

SUMMARY

This disclosure relates to a processing input device data and, more particularly, to a system and method for estimating the distance of an input device from a touch sensitive surface and/or the position of the input device relative to the touch sensitive surface and/or tilt and azimuth of the input device relative to touch sensitive surface when processing input device data. In some examples, an electronic device uses machine learning techniques, such as a convolutional neural network, to estimate the distance between the tip of a stylus and a touch sensitive surface (e.g., stylus z-height). A subset of stylus data, including data having multiple phases and frequencies collected at a subset of electrodes closest to the location of the stylus on the touch sensitive surface can be provided as an input to the machine learning algorithm, for example. In some examples, the machine learning algorithm can be robust to a variety of conditions that can impact estimation of stylus z-height, such as the angle of the stylus relative to the touch sensitive surface, ambient temperature, stylus tip wear, and noise in the stylus data.

In some examples, the touch-sensitive surface can detect a stylus by applying drive signals with multiple frequencies (e.g., F1 and F2) to touch electrodes of the touch sensitive surface. The stylus can include circuitry that generates a non-linear response to the drive signals in some examples. Thus, in some examples, sense circuitry in communication with the touch sensitive surface can detect stylus signals having frequencies that are the second harmonic of the drive frequencies (e.g., 2F1 and 2F2) and signals having frequencies that are the sum of the drive frequencies (e.g., F2+F2). The stylus signals at these frequencies, including in-phase, quadrature, and magnitude signals, at the touch electrodes closest to the stylus can be provided to the machine learning algorithm in some examples.

As described above, in some examples, the machine learning algorithm can estimate the z-height of the stylus using the provided subset of stylus signals. In some examples, the estimated z-height of the stylus can be compared to one or more thresholds to determine whether the stylus is in contact with the touch sensitive surface or not. In some examples, the thresholds include a touchdown threshold and a liftoff threshold that are separated by margins to accommodate possible errors in the z-height estimation.

In some examples, the electronic device can use machine learning techniques to estimate the (x, y) position of the stylus tip and/or the tilt and/or azimuth angles of the stylus. In some examples, a subset of touch data selected based on the relative magnitudes of touch data at multiple touch electrodes can be provided to the machine learning algorithm that estimates the (x, y) position of the stylus tip and/or the tilt and/or azimuth angles of the stylus.

DETAILED DESCRIPTION

Figure 1A:
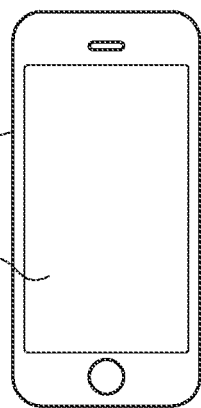
FIGS. 1A-1E illustrate example systems that can implement multi-frequency stylus scans according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

In some examples, the electronic device is able to detect objects proximate to or touching a touch-sensitive surface such as a touch screen. For example, the electronic device can detect conductive objects, such as human fingers, palms, and hands and input devices, such as a stylus. In some examples, a stylus can be an active stylus that includes a power supply and generates a stylus signal that can be detected by the electronic device. The electronic device can detect an active stylus by detecting the stylus signal, which can capacitively couple to one or more touch electrodes of the touch-sensitive surface. In some examples, a stylus can be a passive stylus that does not include a power supply. The passive stylus can include one or more conductive components that can capacitively couple to an electrode of the touch screen to produce or modify a signal sensed by the electronic device. For example, a passive stylus may reduce the capacitive coupling between a drive line and a sense line of the touch-sensitive surface by also being capacitively coupled to the drive and sense lines, thereby modifying the signal sensed by the sense line, thus enabling the electronic device to detect the stylus.

This disclosure relates to a processing input device data and, more particularly, to a system and method for estimating the distance of an input device from a touch sensitive surface and/or the position of the input device relative to the touch sensitive surface and/or tilt and azimuth of the input device relative to touch sensitive surface when processing input device data. In some examples, an electronic device uses machine learning techniques, such as a convolutional neural network, to estimate the distance between the tip of a stylus and a touch sensitive surface (e.g., stylus z-height). A subset of stylus data, including data having multiple phases and frequencies collected at a subset of electrodes closest to the location of the stylus on the touch sensitive surface can be provided as an input to the machine learning algorithm, for example. In some examples, the machine learning algorithm can be robust to a variety of conditions that can impact estimation of stylus z-height, such as the angle of the stylus relative to the touch sensitive surface, ambient temperature, stylus tip wear, and noise in the stylus data.

In some examples, the touch-sensitive surface can detect a stylus by applying drive signals with multiple frequencies (e.g., F1 and F2) to touch electrodes of the touch sensitive surface. The stylus can include circuitry that generates a non-linear response to the drive signals in some examples. Thus, in some examples, sense circuitry in communication with the touch sensitive surface can detect stylus signals having frequencies that are the second harmonic of the drive frequencies (e.g., 2F1 and 2F2) and signals having frequencies that are the sum of the drive frequencies (e.g., F2+F2). The stylus signals at these frequencies, including in-phase, quadrature, and magnitude signals, at the touch electrodes closest to the stylus can be provided to the machine learning algorithm in some examples.

As described above, in some examples, the machine learning algorithm can estimate the z-height of the stylus using the provided subset of stylus signals. In some examples, the estimated z-height of the stylus can be compared to one or more thresholds to determine whether the stylus is in contact with the touch sensitive surface or not. In some examples, the thresholds include a touchdown threshold and a liftoff threshold that are separated by margins to accommodate possible errors in the z-height estimation.

In some examples, the electronic device can use machine learning techniques to estimate the (x, y) position of the stylus tip and/or the tilt and/or azimuth angles of the stylus. In some examples, a subset of touch data selected based on the relative magnitudes of touch data at multiple touch electrodes can be provided to the machine learning algorithm that estimates the (x, y) position of the stylus tip and/or the tilt and/or azimuth angles of the stylus.

Figure 1B:
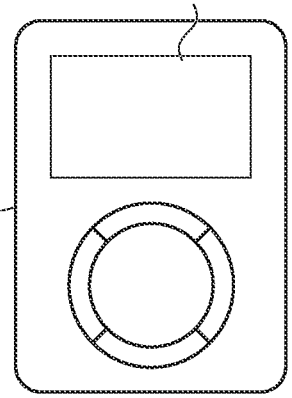
Figure 1C:
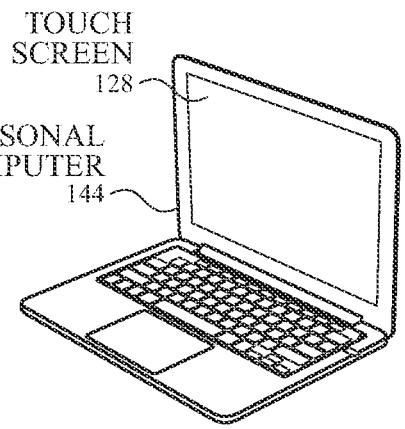
Figure 1D:
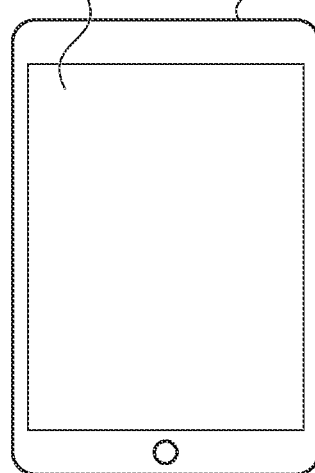
Figure 1E:
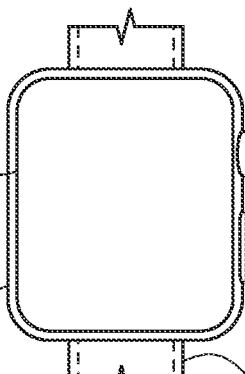

FIGS. 1A-1E illustrate example systems that can use multi-frequency stylus scans according to examples of the disclosure. FIG. 1A illustrates an example mobile telephone 136 that includes a touch screen 124 that can use multi-frequency stylus scans according to examples of the disclosure. FIG. 1B illustrates an example digital media player 140 that includes a touch screen 126 that can use multi-frequency stylus scans according to examples of the disclosure. FIG. 1C illustrates an example personal computer 144 that includes a touch screen 128 that can use multi-frequency stylus scans according to examples of the disclosure. FIG. 1D illustrates an example tablet computing device 148 that includes a touch screen 130 that can use multi-frequency stylus scans according to examples of the disclosure. FIG. 1E illustrates an example wearable device 150 that includes a touch screen 132 and can be attached to a user using a strap 152 and that can use multi-frequency stylus scans according to examples of the disclosure. It is understood that a touch screen and multi-frequency stylus scans can be implemented in other devices as well. Additionally it should be understood that although the disclosure herein primarily focuses on touch screens, the disclosure of multi-frequency stylus scans can be implemented for devices including touch sensor panels (and displays) that may not be implemented as a touch screen.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other (e.g., as described below with reference to FIG. 4A) on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

In some examples, touch screens 124, 126, 128, 130, and 132 can sense an active stylus. The active stylus can produce a stylus signal that can capacitively couple to the touch electrodes of touch screen 124, 126, 128, 130, and 132 to be sensed by sense circuitry coupled to the touch electrodes. In some examples, a touch screen including touch node electrodes 408 can determine the location of the stylus by determining which touch node electrodes 408 detect the stylus signal. In some examples, a touch screen including row electrodes 404 and column electrodes 406 can determine the location of the stylus along the rows and along the columns to determine the location of the stylus on the touch screen. Touch screens can be configured to detect both passive conductive objects (e.g., fingers, passive styluses) and active styluses. For example, the electronic device can perform a mutual or self capacitance scan to detect the conductive objects (e.g., perform a "touch scan") and perform stylus scans to detect the active stylus.

Figure 2:
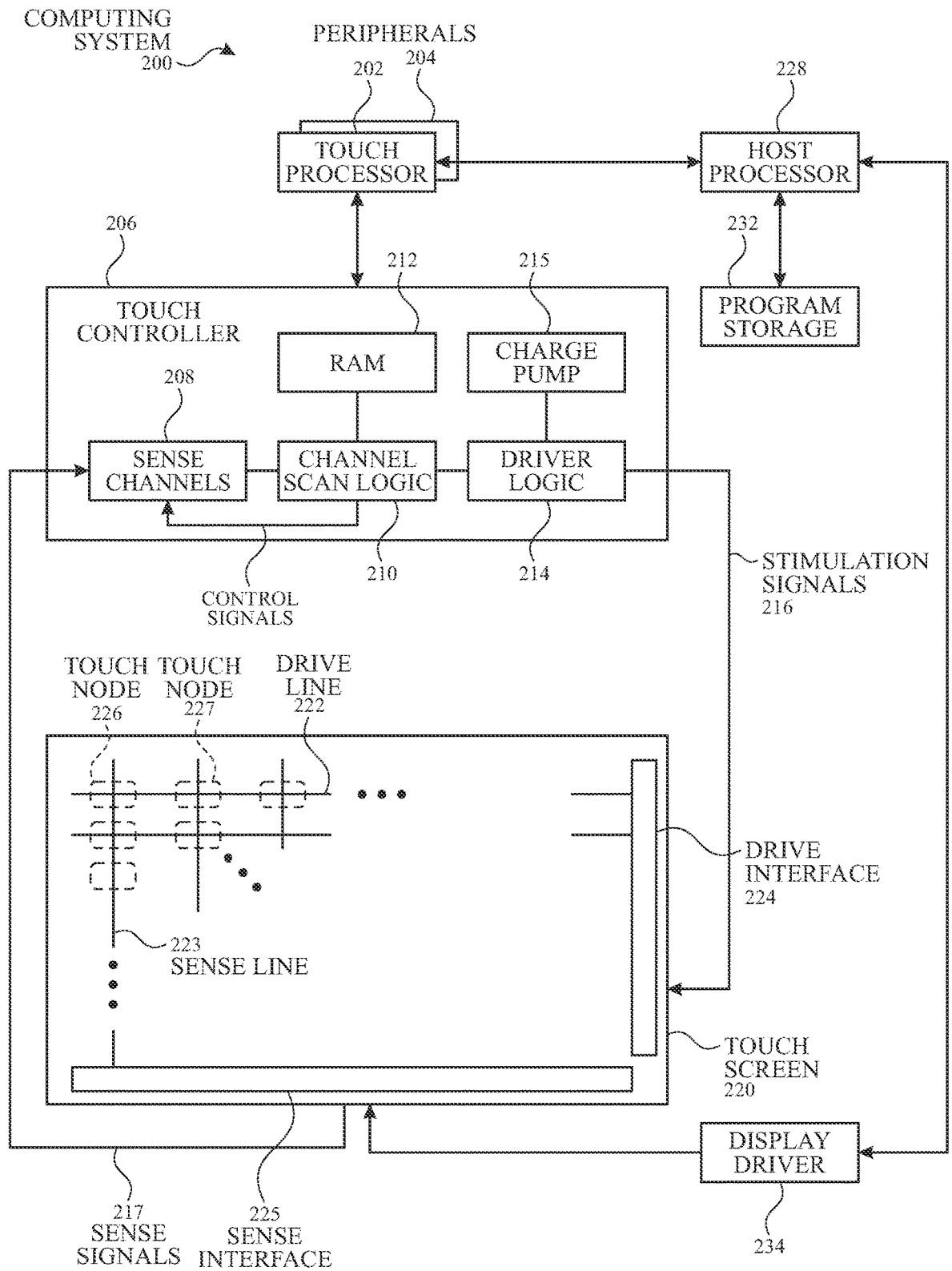
FIG. 2 illustrates an example computing system including a touch screen that can be implemented with multi-frequency stylus scans according to examples of the disclosure.

FIG. 2 illustrates an example computing system including a touch screen that can use multi-frequency stylus scans according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including multi-frequency stylus scans, can be performed by firmware stored in memory (e.g., one of the peripherals 204 in FIG. 2) and executed by touch processor 202 and/or touch controller 206, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive touch nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
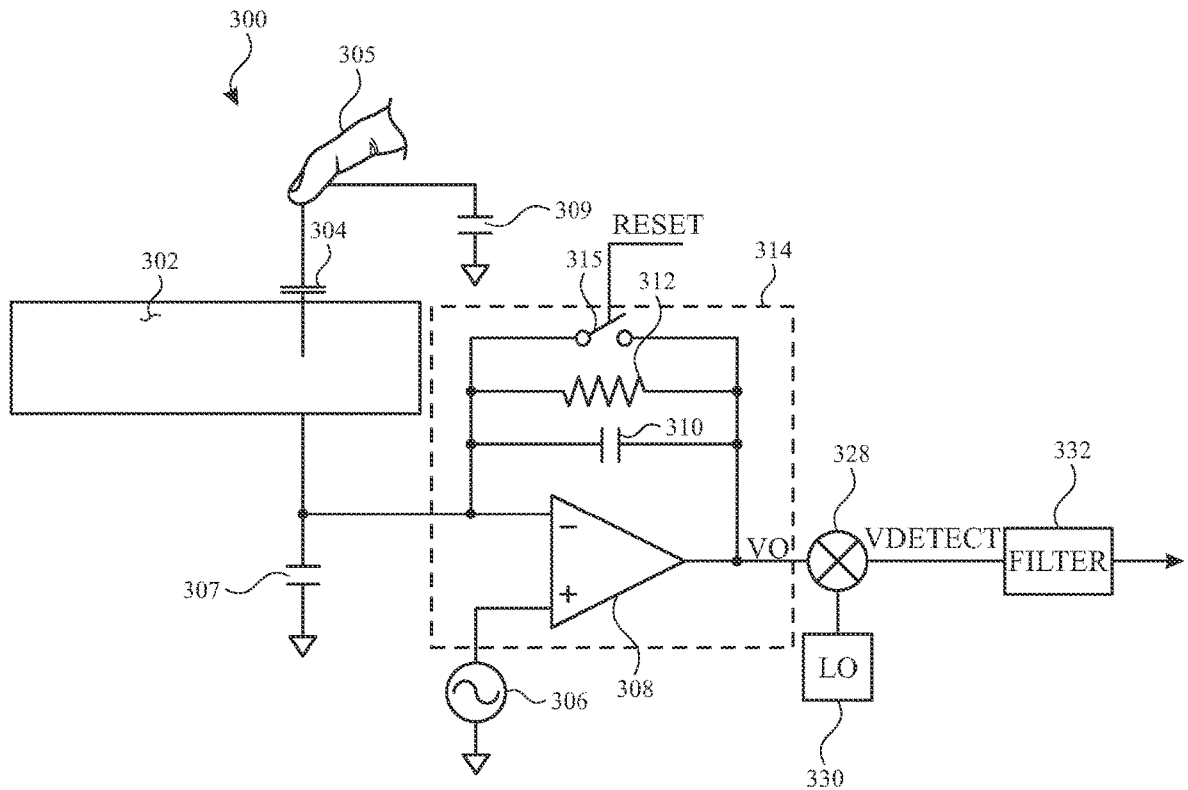
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance capacitance measurement of a touch node electrode 302 and sensing circuit 314 (e.g., implemented in the one or more sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
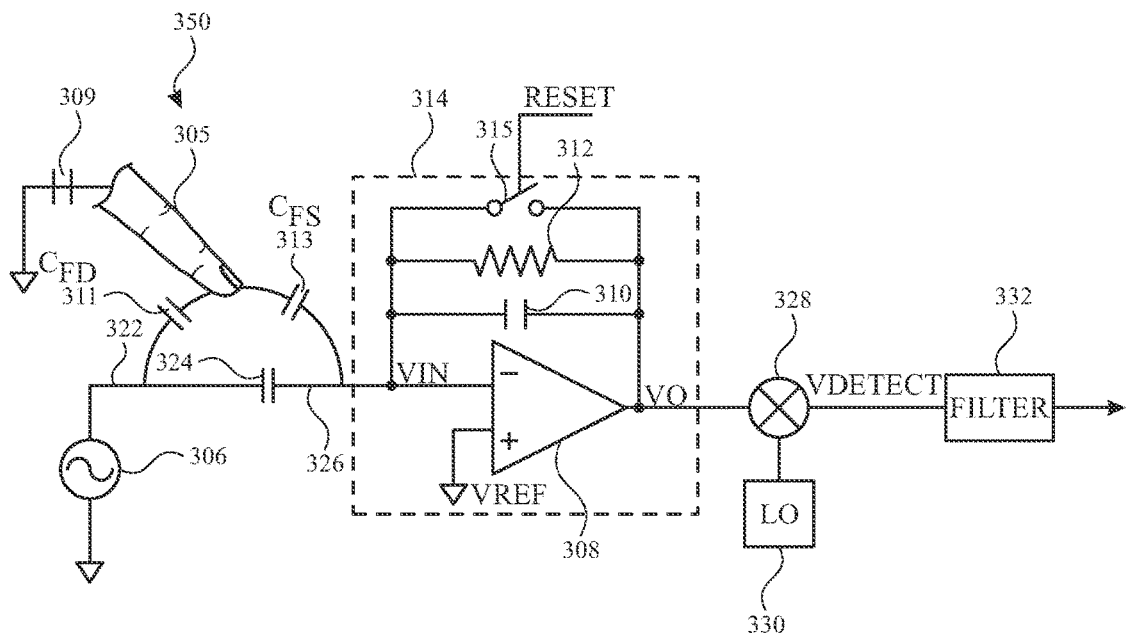
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., implemented in the one or more sense channels 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep yin substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

In some examples, a stylus signal can be detected using touch sensor circuit 350 or similar circuitry. Instead of the drive circuitry providing a stimulation signal (e.g., via AC stimulation source 306) to drive lines 322, the stylus can provide a stylus signal that capacitively couples to sense line 326. The coupled signal can be sensed by sensing circuit 314. In some examples, because the stylus provides the stimulation signal, row electrodes and column electrodes (drive lines and sense lines in the mutual capacitance touch sensing) can be coupled to sensing circuits and can be sensed. For example, the electronic device can perform one or more scans to sense the row electrodes during a first time and can then perform one or more scans to sense the column electrodes during a second time. In some examples, the row electrodes and column electrodes can be sensed simultaneously. In some examples, a touch screen 402 including touch node electrodes 408 can sense an active stylus in a similar manner (e.g., each can be coupled to a sensing circuit 314. Additional examples of active styluses and sensing active styluses are described below with reference to FIGS. 5 and 6.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
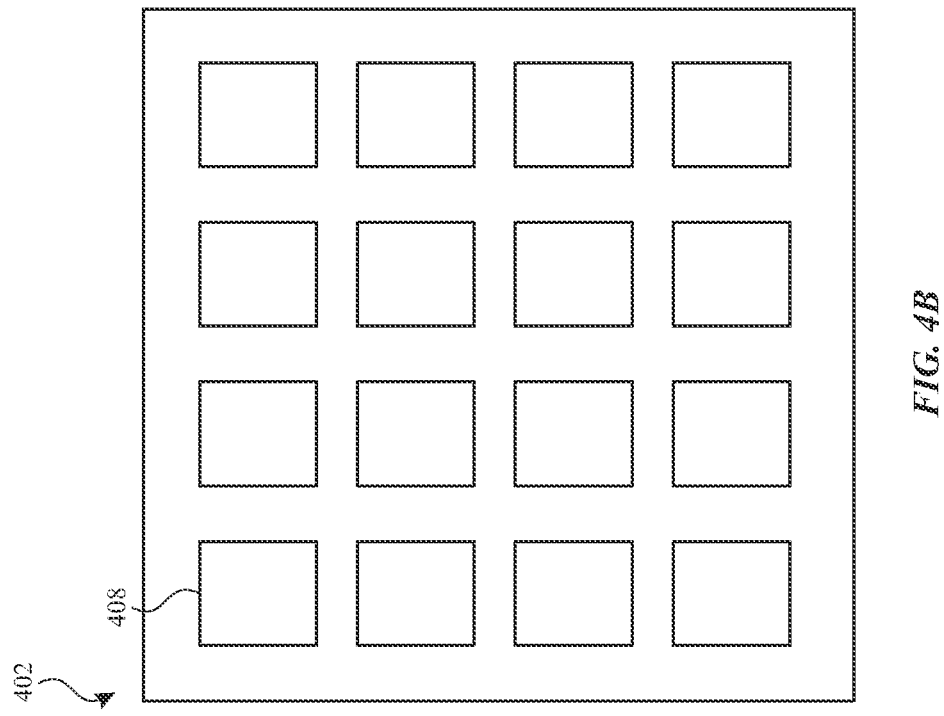
FIG. 4B illustrates touch screen with touch node electrodes arranged in a pixelated touch node electrode configuration according to examples of the disclosure.
Figure 4A:
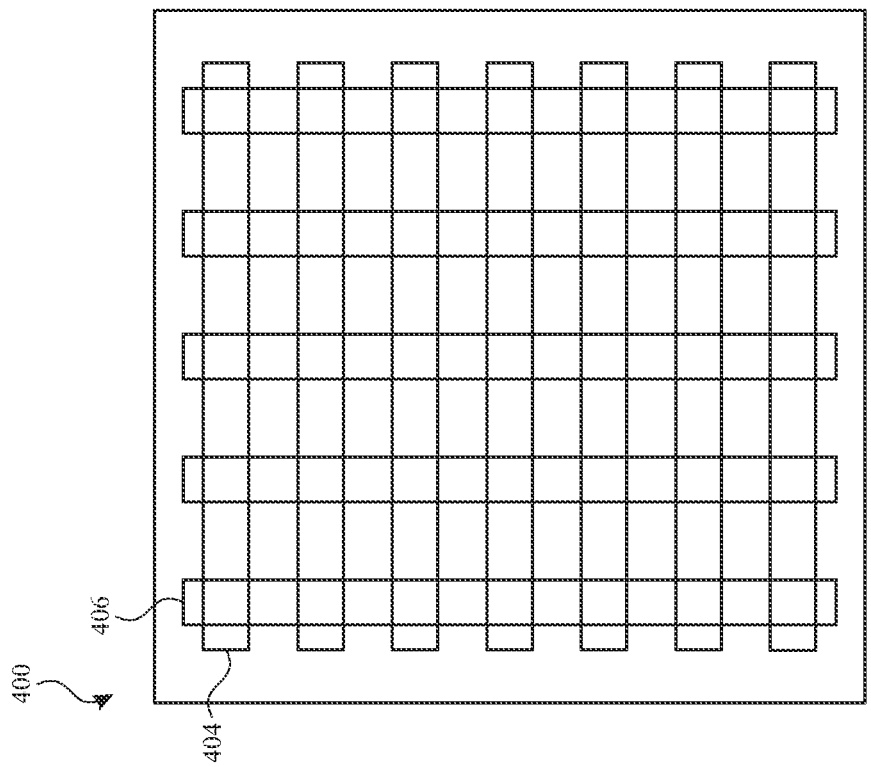
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. In some examples, touch screen 400 can sense a stylus signal provided by an active stylus using touch electrodes 404 and 406.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. In some examples, touch screen 402 can use touch electrodes 408 to sense an active stylus.

Figure 5:
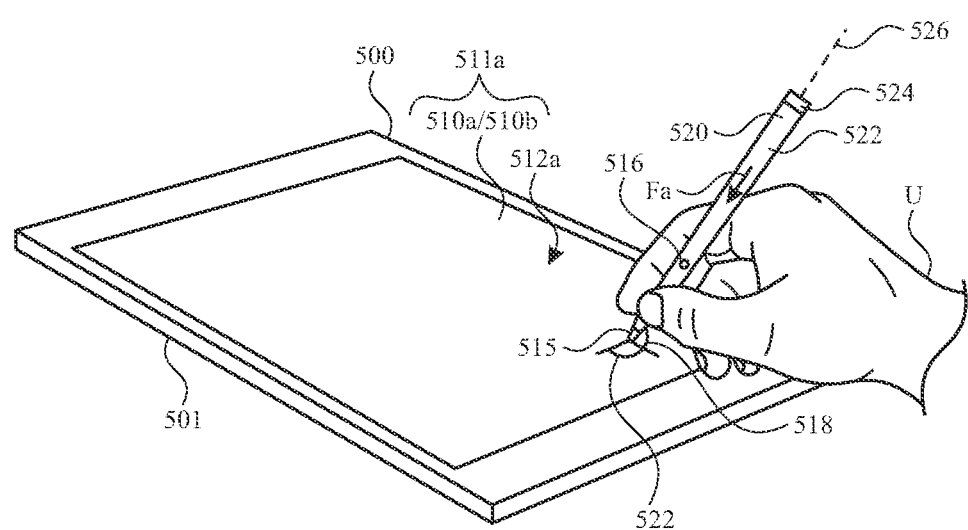
FIG. 5 illustrates an exemplary stylus and exemplary electronic device according to some examples of the disclosure.

FIG. 5 illustrates an exemplary system including a stylus 520 and an electronic device 500 according to some examples of the disclosure. Stylus 520 (e.g., a marking tool, smart pen, smart brush, wand, chisel, user-manipulated electronic input device, hand-held input device, and the like, or any other suitable accessory, such as a glove) may be configured to provide input to electronic device 500 (e.g., a tablet computer, laptop computer, desktop computer, and the like). A system user may manipulate the orientation and position of stylus 520 relative to a surface of the touch-sensitive display of electronic device 500 to convey information to electronic device 500, such as, but not limited to, writing, sketching, scrolling, gaming, selecting user interface elements, moving user interface elements, and so on. In some examples, the surface of the touch-sensitive display of electronic device 500 may be a multi-touch display screen. However, in some examples, the surface of the touch-sensitive display of electronic device 500 may be a non-display surface of the touch-sensitive display, such as, but not limited to, a trackpad or drawing tablet. The surface of the touch-sensitive display may be a foldable or flexible surface or display. Electronic device 500 may be used to capture free-form user input from stylus 520. For example, the user can slide, move, draw, or drag a tip of stylus 520 across the surface of the touch-sensitive display of electronic device 500, which, in response, may render a graphical object (e.g., a line) using a display positioned below the surface of the touch-sensitive display. In such an example, the rendered graphical object may follow or otherwise correspond to the path of stylus 520 across the surface of the touch-sensitive display of electronic device 500. The thickness and/or shape and/or intensity and/or any other suitable rendered characteristic of the rendered graphical object may vary based, at least in part, on one, some, or each of various characteristics, including, but not limited to, a force or speed with which the user moves stylus 520 across the surface of the touch-sensitive display, an angle of stylus 520 relative to the surface of the touch-sensitive display (e.g., the inclination of stylus 520 relative to a plane of the surface of the touch-sensitive display, a writing angle of stylus 520 relative to a horizontal writing line traversing the surface of the touch-sensitive display, etc.), a variable setting of a variable input component of stylus 520, which one of multiple tips of stylus 520 is interacting with the surface of the touch-sensitive display, a variable setting of an application running on electronic device 500 (e.g., a virtual drawing space application), and/or a combination thereof.

Broadly and generally, electronic device 500 may be operative to determine and/or estimate one or more outputs of stylus 520 (and/or changes therein over time as a scalar or vector quantity), to interpret the user's manipulation thereof as input to electronic device 500. For example, electronic device 500 may be operative to estimate: the magnitude of force applied by a user's grip to stylus 520 (e.g., non-binary estimate of magnitude as a scalar or vector quantity); a magnitude (e.g., non-binary estimate of magnitude as a scalar or vector quantity) of force applied (e.g., force applied (Fa)) by stylus 520 to the surface of the touch-sensitive display of electronic device 500; the location at which the area over which stylus 520 may touch or nearly touch the surface of the touch-sensitive display of electronic device 500; a polar angle of stylus 520 relative to a plane of the surface of the touch-sensitive display (e.g., inclination of stylus 520 (e.g., a polar angle 518 (e.g., as may be defined between a vector normal to the plane of surface of the touch-sensitive display 510a and a longitudinal axis 526 of stylus 520, such as a zenith))); an azimuthal angle of stylus 520 relative to an axis of the surface of the touch-sensitive display (e.g., an azimuthal angle 522 (e.g., as may be defined between the polar angle 518 and a reference vector within the plane of surface of the touch-sensitive display 510a, such as an axis of electronic device 500)); a vector or scalar representation of the angular position of stylus 520 relative to a plane of the surface of the touch-sensitive display; three-dimensional coordinates (e.g., spherical, Cartesian, and so on) of one or more points along the length of stylus 520 relative to the surface of the touch-sensitive display; and so on. In some examples, electronic device 500 may be operative to monitor such variables over time to estimate rates of change therein as either scalar or vector quantities (e.g., velocity, acceleration, and so on). The operation of estimating or determining two-dimensional position coordinates of stylus 520 as a point (or area) within or parallel to a plane of the surface of the touch-sensitive display, whether such operation is performed by electronic device 500, performed by stylus 520, and/or performed, at least in part, as a result of cooperation there between (or with one or more other electronic devices), is generally referred to herein as "locating" the stylus.

Electronic device 520 and/or stylus 520 can be configured to estimate and/or monitor the location of stylus 520 over time and compute differential or integral quantities such as, but not limited to, acceleration, velocity, total force applied, path length, and so on. For example, the operation of estimating the velocity and/or acceleration of stylus 520 relative to the surface of the touch-sensitive display as stylus 520 is moved across that surface, whether such operation is performed by electronic device 500, performed by stylus 520, and/or performed, at least in part, as a result of cooperation therebetween (or with one or more other electronic devices), is generally referred to herein as estimating the "planar motion" of the stylus. The operation of estimating the angular velocity and/or acceleration of stylus 520 relative to a plane of the surface of the touch-sensitive display as it is moved thereacross, whether performed by electronic device 500, performed by stylus 520, and/or performed, at least in part, as a result of cooperation therebetween (or with one or more other electronic devices), is generally referred to herein as estimating the "angular motion" of the stylus. Additionally or alternatively, electronic device 500 and/or stylus 520 can be configured to estimate the distance (e.g., Z-height) of a portion of stylus 520 (e.g., the tip of the stylus) from the surface of the touch-sensitive display of device 500, and such an estimated distance may be used to determine a "make or break" event between the stylus and device, such as for making a determination when a drawn graphical line should start or stop or a stylus lift off event should occur.

Electronic device 500 may be any portable, mobile, or hand-held electronic device configured to interact with stylus 520 for changing any suitable characteristic(s) of device 500 (e.g., any suitable graphical object input tool characteristics that may be utilized to render a graphical object) in response to manipulation of stylus 520 across a surface of the touch-sensitive display of electronic device 500. Alternatively, electronic device 500 may not be portable at all, but may instead be generally stationary. Electronic device 500 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 500 may include one or more components described above with reference to FIG. 2 (e.g., electronic device 500 can be the same as electronic device 200).

Returning to FIG. 5, a user U manipulates the orientation and position of stylus 520 relative to surface of the touch-sensitive display input component 510a (e.g., a particular input component 510) of electronic device 500 in order to convey information to electronic device 500. Electronic device 500 may be configured to perform or coordinate multiple operations such as, but not limited to, locating stylus 520, estimating the angular position of stylus 520, estimating the magnitude of force by stylus 520 to surface of the touch-sensitive display 510a, determining a variable setting of a variable input component of stylus 520, determining a variable setting of an application running on electronic device 500 (e.g., a virtual drawing space application), and/or a combination thereof. The electronic device 500 can perform these and other operations at the same time or at different times. In one non-limiting example, the operation of determining the location of stylus 520 can be performed simultaneously with the operation of determining the angular position of stylus 520, while the operation of estimating the magnitude of force by stylus 520 to surface of the touch-sensitive display 510a may be performed periodically and/or based on whether electronic device 500 is configured to accept force input from stylus 520 given a particular operational mode of electronic device 500 (or of stylus 520) at a particular time.

FIG. 5 illustrates an exemplary stylus 520 and exemplary electronic device 500 according to some examples of the disclosure. A user U can grip a barrel or handle or body portion 522 of stylus 520 extending between a front tip portion 515 of stylus 520 and a rear tip portion 524 of stylus 520. User U may interact with the electronic device 500 by sliding a tip portion, such as tip portion 515, of stylus 520 across surface of the touch-sensitive display 510a of electronic device 500. As shown in FIG. 5, for example, device 500 can be a tablet computing device. It should be understood that many other electronic devices (with or without displays positioned below a stylus surface of the touch-sensitive display), such as any of the electronic device described above with reference to FIGS. 1A-1E, can be used to detect stylus 522. For example, the electronic device can be implemented as a peripheral input device, a trackpad, a drawing tablet, and the like.

In some examples, stylus 520 may have a general form of a writing instrument, such as a pen- or pencil-like structure with a cylindrical body 522 with two ends, such as a first end terminated at front portion 515 and a second end terminated at rear portion 524. One or more of portions 515 and 524 can be removable, affixed to body 522, or an integral part of body 522. In some examples, other input devices with different form factors are possible.

Tip portion 515 of stylus 520 may be configured to contact or nearly contact surface of the touch-sensitive display 510a of device 500, allowing the user U to use the stylus 520 to interact with the device 500. In some examples, tip 515 can include a tapered end or point, similar to a pen, which can enable the user U to more precisely control stylus 520 and provide a familiar form factor. In some examples, tip 515 may be blunt or rounded, may take the form of a rotatable or fixed ball, or may have another shape. Tip 515 can include a material that can be softer than a material of the surface of the touch-sensitive display 510a. For example, tip 515 can include a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In some examples, tip 515 may not cause damage to surface of the touch-sensitive display 510a or layers applied to surface of the touch-sensitive display 510a when the stylus 520 is in use.

In some examples, device 500 can include a sensor layer input component 510b. The input component 510b can be positioned below or integrated with surface of the touch-sensitive display 510a and/or display 512a. The device 500 may use the sensor layer to detect proximate objects, including detecting the presence and/or location of stylus 520 on surface of the touch-sensitive display 510a. In other examples, device 500 may use sensor layer 510b to detect the presence of another object on surface of the touch-sensitive display 510a, such as a finger of the user U. In still further examples, device 500 may use sensor layer 510b to detect the force with which an object, such as stylus 520 or other object, presses on surface of the touch-sensitive display 510a. In some examples, the sensor layer 510b (e.g., of surface of the touch-sensitive display input component 510a) can be optically transparent (e.g., in the case of a touch screen overlaid on or integrated with a display) or opaque (e.g., in the case of a trackpad or other opaque touch-sensitive surface). In some examples, surface of the touch-sensitive display 510a and/or sensor layer 510b may provide at least a portion of a foldable or flexible surface or display.

A stylus may not include a power supply (e.g., battery or wired powered supply), therefore, the stylus 520 may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 511a of electronic device 500 and that may be operative to stimulate the stylus I/O circuitry when located proximate to device I/O interface 511a and/or by user U when holding stylus 520, whereby that stimulation of the stylus I/O circuitry may be operative to enable the stylus I/O circuitry to provide any suitable stylus electric field that may then be detected by device 500 for estimating the location of the stylus. Not only may such stylus I/O circuitry be configured to require no internal power supply for providing a unique stylus electric field, but also such stylus I/O circuitry, when stimulated, may be configured to provide a stylus electric field that may be distinguishable by device 500 from an electric field that may be provided by a user's direct contact with device I/O interface 511*a*.

Figure 6:
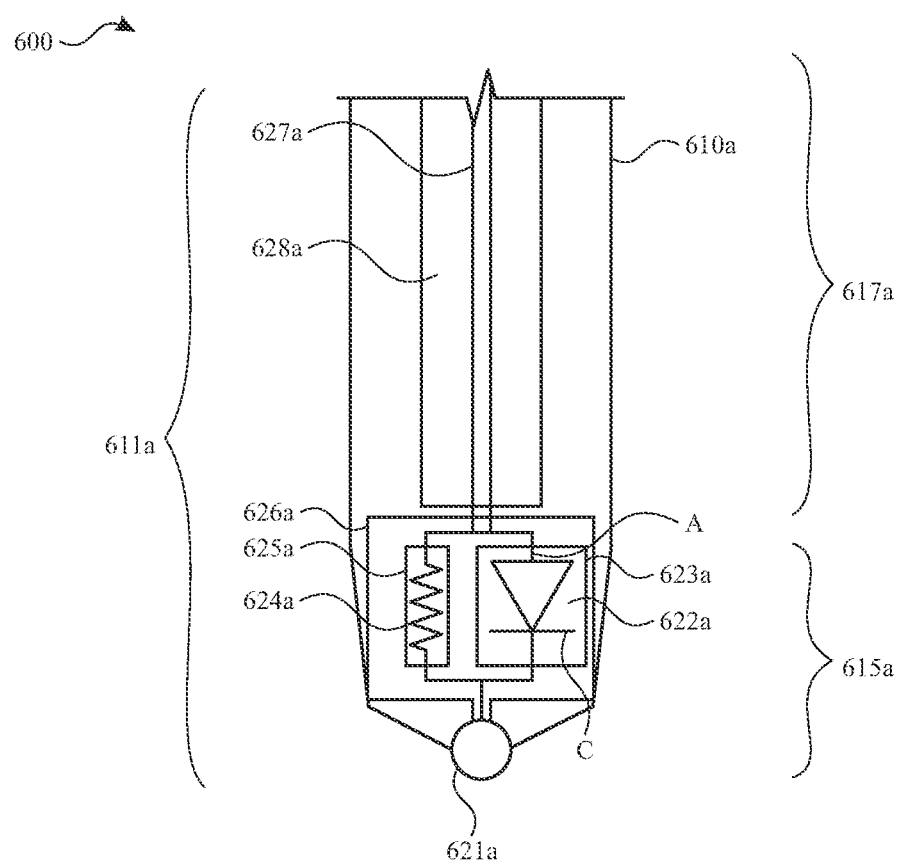
FIG. 6 illustrates an exemplary stylus according to some examples of the disclosure.

For example, FIG. 6 illustrates an exemplary stylus 600 according to some examples of the disclosure. In some examples, stylus 600 may include stylus I/O circuitry 611*a*. Stylus I/O circuitry 611*a* may operate in response to external stimulus, such as a drive signal generated by an electronic device (e.g., electronic device 136, 140, 144, 148, 150, 200, or 500). As shown by FIG. 6, for example, stylus 600 may include body portion 617*a* extending between a front tip portion 615*a* and a rear tip portion (not shown), where body portion 617*a* may be configured to be held by user U as the user uses stylus 600 to interact with an electronic device.

In some examples, body stylus circuitry 627*a* may be electrically coupled to front tip stylus circuitry 626*a* and/or to rear tip stylus circuitry (not shown). Body stylus circuitry 627*a* may be any suitable circuitry that may be operative to be electrically coupled (e.g., capacitively coupled) to user U when user U is holding stylus 600 about at least a portion of body portion 617*a*. As shown in FIG. 6, for example, body stylus circuitry 627*a* may include at least one conductive material extending along at least a portion of a length of body portion 617*a* of stylus 600, which may be insulated by any suitable insulation 628*a*. In some examples, body stylus circuitry 627*a* may include a conductive (e.g., copper) tape along a portion of body 617*a*, where such tape may be positioned under any suitable insulation, such as a finger pad of any suitable material. The stylus can include any suitable housing 610*a*, such as a plastic housing. In some examples, the housing 610*a* can include insulation 528*a*. In some examples, at least a portion of body stylus circuitry 627*a* may be at least partially exposed via housing 610*a* and/or insulation 628*a*, thereby enabling direct contact by user U.

In some examples, stylus I/O circuitry 611*a* can include a front tip interface component 621*a* that can be included in front tip portion 615*a* of the stylus 600. In some examples, front tip interface component 621*a* can include one or more of, silicone, rubber, fluoro-elastomer, plastic, nylon, conductive or dielectric foam, metal (e.g., brass (e.g., a brass ball with a dielectric or polymer coating (e.g., a thin coating with a high dielectric constant))), or any other suitable material or combination of materials. Thus, in some examples, contact and movement of front tip interface component 621*a* across surface of the touch-sensitive display 510*a* of electronic device 500 may not damage surface of the touch-sensitive display 510*a* or layers applied to surface of the touch-sensitive display 510*a*. In some examples, front tip interface component 621*a* can be removably attached to body 617*a*, such as via threadings/screws, detents and/or recesses, interference-fit or snap-fit, and/or magnetic attraction, and/or the like.

Front tip stylus circuitry 626*a* may be positioned between and electrically coupled to front tip interface component 621*a* and body stylus circuitry 627*a*. Front tip stylus circuitry 626*a* can provide a non-linear load between body stylus circuitry 627*a* and front tip interface component 621*a*. In some examples, the front tip interface component 621*a* of stylus 600 may be stimulated by a signal that can be generated by device I/O circuitry of device I/O interface 511*a* of electronic device 500. For example, front tip stylus circuitry 626*a* may include any suitable non-linear electrical circuitry 623*a* that may be electrically coupled (e.g., in series) between front tip interface component 621*a* and body stylus circuitry 627*a*. For example, the non-linear circuitry 623*a* of stylus 600 can include at least one diode 622*a*. As shown in FIG. 6, an anode A of diode 622*a* may be electrically coupled to body stylus circuitry 627*a* and a cathode C of diode 622*a* may be electrically coupled to front tip interface component 621*a*. It should be understood, however, that it is possible to orient the diode 622*a* in the opposite way (e.g., connecting the anode A to the front tip interface component 621*a*). In some examples, the stylus 600 can include any suitable number (e.g., one or two or three or four or more) of diodes 622*a*. The diodes can be coupled together in series (e.g., a cathode of one diode may be coupled to an anode of a next diode and/or the like) or in parallel.

Device I/O circuitry of I/O interface 511*a* of an electronic device 500 may provide a drive signal that can stimulate front tip interface component 621*a* of stylus 600 when front tip interface component 621*a* of stylus 600 is proximate to or touching surface of the touch-sensitive display input component 510*a* of I/O interface 511*a*. In some examples, the drive signal can be capacitively coupled to the tip 621*a* of the stylus 600. A non-linear response of the stylus 600 can be transmitted via tip 621*a* to one or more sense electrodes of the electronic device 500, enabling the electronic device 500 to detect and locate the stylus 600, as will be described in more detail below with reference to FIGS. 7-8.

Moreover, in some examples, non-linear electrical circuitry 623*a* that may be electrically coupled to front tip interface component 621*a* may enable stylus 600 to be identified and distinguished from nearby user touches, dragging fingers, palm rests, and/or the like, due to a non-linear load that may generate a non-linear distortion or harmonics (e.g., a second harmonic) at touch pixels near the stylus tip. In some examples, diode 622*a* may be provided with any suitable characteristics that enable the electronic device 500 to detect stylus 600. For example, diode 622*a* can have a low capacitance (e.g., low parasitic capacitance), low reverse leakage, and/or low turn on voltage diode. The junction capacitance of such a diode may be configured to be low (e.g., less than 1.0 picofarad and/or less than 50 femtofarads). A reverse leakage current of such a diode may be controlled to be not too high. A Schottky diode, two or more Schottky diodes in series, or a specifically designed diode may be used.

In some examples, as shown, circuitry 626*a* may also include (e.g., in parallel with non-linear electrical circuitry 623*a*) any suitable resistance circuitry 625*a* (e.g., at least one resistor 624*a*). Resistor 624*a* can control reverse leakage current of non-linear electrical circuitly 623*a* and/or prevent direct current ("DC") positive voltage build up at the diode by, for example, draining off any DC while maintaining non-linearity of circuitry 626*a*. The resistance of resistor 624*a* may be selected in any suitable manner, such as by using a model of the panel, including its stimulation voltage and capacitance to the tip, and the non-linear device model, and optimizing the model. As an example, when using one or more Schottky diodes for non-linear electrical circuitry 623*a*, the resistance of resistor 624*a* can be in the range of 4.0-6.0 megohms, or even no additional leakage may be needed.

Therefore, stylus 600 may be configured to operate as a passive or semi-passive, non-linear stylus. A semi-passive stylus may be a stylus without an active transmitter, such as a stylus that may be configured to react to the incident field but that may not be a simple linear probe like a user's finger or a conductive rod. Stylus 600 may be fabricated at a very low cost, as it may not require any internal power supply and may not require any direct coupling or communication of any wired/wireless communication interface with device 600. Stylus 600 can have an advantage over a passive stylus on a projected capacitance input device by being able to be distinguished from direct user touch events (e.g., unintentional user touch events). Non-linearity of stylus 600 may double (or otherwise provide any suitable multiple of) a modulation frequency (e.g., a fundamental frequency) of a transmitted signal TS (e.g., from 200 kHz to 400 kHz) such that many cycles of non-linearity may be detected, such that noise may be reduced by requiring detection of a harmonic multiple times within multiple cycles or just once in a single cycle.

Figure 7:
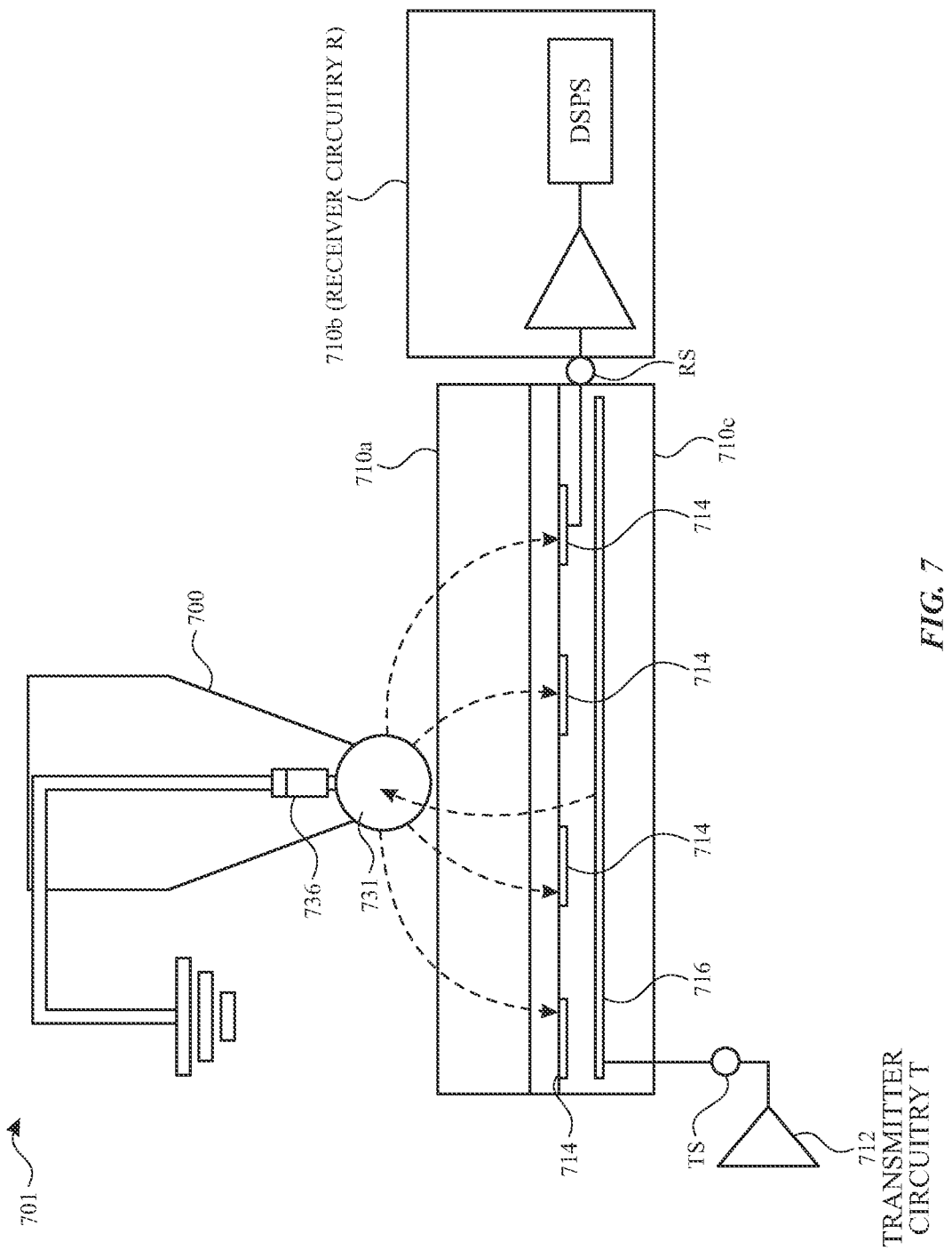
FIG. 7 illustrates detection of an exemplary stylus by an exemplary electronic device according to some examples of the disclosure.

FIG. 7 illustrates detection of an exemplary stylus 700 by an exemplary electronic device according to some examples of the disclosure. As mentioned, and as further shown in FIG. 7, sensor layer 710a of electronic device (e.g., electronic device 136, 140, 144, 148, 150, 200, 500) can include matrix or array or grid of any suitable number of column electrodes 716 and any suitable number of row electrodes 714, any two of which may intersect to provide a touch node. Column electrodes 716 may also be referred to herein as transmit electrodes, while row electrodes 714 may also be referred to herein as receive electrodes. As described in more detail below with reference to FIG. 8, however, both the rows 714 and the columns 716 are able to function as both transmit electrodes and receive electrodes in a time-multiplexed manner. In some examples, the electrodes can include an optically transparent conductive material, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like.

Any suitable electrical signal (e.g., transmit signal) TS, such as any suitable voltage waveforms (e.g., sinusoidal drive or trapezoidal voltages), may be emitted or transmitted on one, some, or each transmit electrode by any suitable transmitter circuitry T of I/O interface (e.g., of sensor layer 710a). Such a transmit signal TS may drive non-linear circuitry of a stylus (e.g., circuitry 736 of stylus 700) that may be positioned on or near the surface of the touch-sensitive display, and such non-linearity may produce harmonics or any other suitable non-linear aspects of transmit signal TS. Any suitable electrical signal (e.g., receive signal) RS, such as any suitable sensed current (e.g., $I_{sense}$), may be detected by any suitable receiver circuitry R of I/O interface (e.g., of sensor layer 710a) that may be provided along each one of the receive electrodes or that may be shared and used serially with two or more receive electrodes. As shown, receiver circuitry R may be any suitable circuitry, such as any suitable operational amplifier circuitry (e.g., a current sense amplifier (e.g., with feedback)) and an analog-to-digital converter ("ADC") that may be operative to digitize a current or other signal that may be sensed on a receive electrode (e.g., receiver circuitry R may be operative to hold other electrodes at virtual ground and utilize a current to voltage amplifier and then digitize the voltage on the receive electrode). Then, any suitable digital signal processing ("DSP") may be provided by a processor of the electronic device and any suitable application running thereon in combination with the circuitry of I/O interface (e.g., circuitry T and circuitry R of sensor layer 710a) in order to extract any non-linear aspects of the receive signal RS with respect to the transmit signal TS (e.g., to demodulate the second harmonic of a sine wave) and then to estimate a position of the stylus or accessory tip with respect to the device (e.g., X-Y location along the surface of input component 710a) based on the extracted non-linear aspects.

In some examples, one DSP per receive electrode demodulation path may include a filter that includes two-times the stimulation frequency (e.g., the frequency of the stimulation transmitted signal TS) in its passband in order to detect the location of a stylus with non-linear circuitry (e.g., circuitry providing a second harmonic). This technique may be used to identify the location of the stylus and without detecting objects (e.g., the user's hand) that may not provide any non-linearity. Therefore, a transmitted signal (e.g., stimulation voltage (e.g., a pure tone or only with odd harmonics)) may be provided on one or more transmit electrodes to drive non-linear circuitry of a stylus that may produce at a stylus tip harmonic(s) or any other suitable non-linear aspect(s) of the transmitted signal. For example, the stylus may cause asymmetrical distortion due to a non-linear load (e.g., rectifier (e.g., diode)). In some examples, the electronic device can detect the stylus signal on one or more receive electrodes and, through any suitable processing (e.g., DSP), identify harmonics or non-linearity to identify the stylus.

In some examples, the electronic device is subject to noise from one or more sources (e.g., from other circuitry of electronic device, from external electrical signals, etc.). Thus, in some examples, the electronic device can include additional circuitry that mitigates noise and/or receiver circuitry 710b can perform one or more additional operations to mitigate noise. In some examples, the drive signal is a sinusoid at a predetermined fundamental frequency. In some embodiments, however, noise in the system can cause the drive signal to include noise, such as noise at a second or other harmonic of the fundamental frequency. The electronic device can estimate the noise in the drive signal and use the estimated noise when processing the sensed signal to reduce or remove components in the sensed signal that were caused by noise in the drive signal. For example, the electronic device can estimate frequency content at the second harmonic of the fundamental frequency in the drive signal and subtract, from the sensed signal, the portion of the signal at the second harmonic frequency that was provided by the drive signal itself to obtain a more accurate measurement of the signal at the second harmonic frequency that was provided by the stylus. Other types of noise removal techniques can be used to remove noise from the drive signal and sense signal before or after performing touch processing to determine the location of the stylus.

Thus, as described above with reference to FIG. 7, the electronic device can use the non-linearity of the stylus to differentiate the stylus from other conductive objects that do not include non-linear components. In some examples, the signal sensed by the system can include content with the second harmonic frequency when the stylus is present. When the stylus is not present, the sensed signal can include the fundamental frequency without including the second and other higher-order harmonics, for example.

Figure 8:
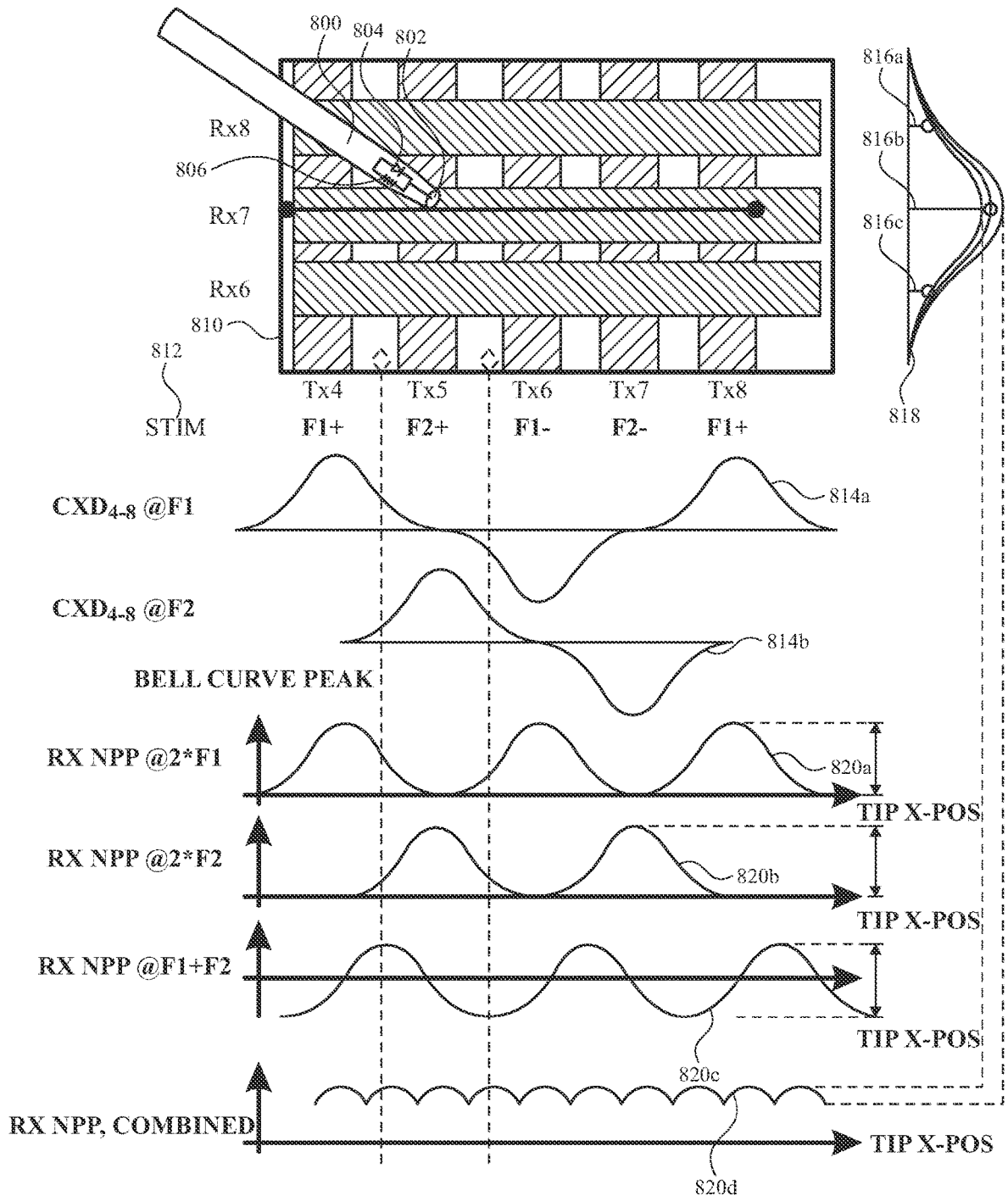
FIG. 8 illustrates detection of an exemplary stylus at an exemplary touch-sensitive surface of an electronic device according to some examples of the disclosure.

FIG. 8 illustrates detection of an exemplary stylus 800 at an exemplary touch-sensitive surface 810 of an electronic device according to some examples of the disclosure. Stylus 800 can be similar to stylus 500, 600, or 700 described above with reference to FIGS. 5-7. Stylus 800 can include a non-linear component (e.g., diode 804) in parallel with resistor 806. Diode 804 and resistor 806 can be coupled to a conductive tip 802 of the stylus 800. Thus, in some examples, one or more sense signals generated by the touch-sensitive surface 810 can capacitively couple to the circuitry of stylus 800. The stylus 800 can generate a non-linear response to the drive signal generated by the touch sensitive surface. In some examples, the touch-sensitive surface can include a plurality of electrodes arranged in rows Rx6-8 and columns Tx4-8. Although FIG. 8 illustrates a touch-sensitive surface with three row electrodes Rx6-8 and five column electrodes Tx4-8, in some examples, a different number of row and/or column electrodes can be used.

As shown in FIG. 8, during one of the scans of the touch-sensitive surface 810, the column electrodes Tx4-8 can be driven with a plurality of signals and the row electrodes Rx6-8 can be sensed. As described above with reference to FIG. 7, the nonlinearity of the stylus 800 can cause the stylus to generate a non-linear response to the stimulation voltages supplied by the touch-sensitive surface 810. For example, the frequency content of the stylus 800 signal can include the second harmonic of the frequency of the signal provided by touch-sensitive surface 810. This non-linearity can distinguish the stylus 800 from conductive objects that do not generate a non-linear response to the signals generated by the touch-sensitive surface 810, as described above with reference to FIG. 7.

In some examples, the location of the stylus 800 along the vertical axis can be determined by sensing the row electrodes Rx6, Rx7, and Rx8 and calculating a location of the centroid. The sense circuitry (e.g., receiver circuitry 710*b*) can include a plurality of DSPs that include filters tuned to the second harmonic(s) of the drive frequency or frequencies applied to the panel. As shown in FIG. 8, because the stylus 800 is located closest to Rx7, the magnitude 818 of the sense signal is maximized at the location of Rx7 816*b* and the magnitude 818 of the sense signal has a lower magnitude at the locations 816*a* and 816*c* of Rx8 and Rx6, respectively, for example.

In some examples, calculation of the centroid of the sense signal 818 can be sufficient to determine the location of stylus 800 along the axis of the sense electrodes (e.g., along the rows as shown in FIG. 8). A second stylus detection scan can be performed in which the rows are driven and the columns are sensed in order to determine a centroid of the location of the stylus 800 along the columns, for example. In some examples, however, the signal-to-noise ratio of the stylus signal may be insufficient to determine a precise location of the stylus 800. Applying drive signals of different frequencies to alternating drive electrodes and evaluating the frequency content of the received signal can enable the electronic device to more precisely determine the location of the stylus 800.

In some examples, the touch-sensitive surface 810 can be simultaneously driven with drive signals having different frequencies (e.g., F1 and F2). As shown in FIG. 8, the first frequency F1 can be applied to every other column, such as Tx4, Tx6 and Tx8 and the second frequency F2 can be applied to the other columns, such as Tx5 and Tx7. Thus, the drive signals can be arranged in an alternating order based on frequency, for example. Moreover, in some examples, the drive signals can have different phases. As shown in FIG. 8, columns Tx4, Tx6, and Tx8 can each be driven with the first frequency with alternating phases: columns Tx4 and Tx8 can be driven with a signal having the first frequency F1 and a positive phase and column Tx6 can be driven with a signal having a negative phase. Similarly, columns Tx5 and Tx7 can be driven with signals having the second frequency F2, but column Tx5 can receive a positive-phase signal and Tx7 can receive a negative-phase signal.

Thus, different column electrodes included in touch-sensitive surface 810 can be driven with a drive signal having one of two possible frequencies and one of two possible phases, for example. In some examples, the magnitudes of these drive signals will therefore have different relative magnitudes at different horizontal locations along the touch-sensitive surface 810. The magnitude of the drive signals having the first frequency F1 can be represented by graph 814*a* and the magnitude of the drive signals having the second frequency F2 can be represented by graph 814*b*. Graphs 814*a* and 814 include curves above the horizontal axis that illustrate the magnitude of the respective drive signal having positive phase (e.g., F1+, F2+) and curves below the horizontal axis illustrating the magnitude of respective drive signals having negative phase (e.g., F1-, F2-1).

For example, at the horizontal location at the center of Tx4 and Tx8, the magnitude of the first frequency F1 is maximized with positive phase, as shown by curve 814*a* and the magnitude of the second frequency F2 is minimized (e.g., approximately 0), as shown by curve 814*b* because the drive signal with the first frequency F1 with positive phase is applied to electrodes Tx4 and Tx8. As another example, at the location of Tx5, the magnitude of the second frequency F2 is maximized with positive phase, as shown by curve 814*b* and the magnitude of the first frequency F1 is minimized (e.g., approximately 0), as shown by curve 814*a* because a drive signal with the second frequency F2 and a positive phase is applied to Tx5. Similarly, for example, at the location of Tx6, the magnitude of the first frequency F1 with negative phase is maximized, as shown by curve 814*a* and the magnitude of the second frequency F2 is minimized (e.g., approximately 0), as shown by curve 814*b* because a drive signal with the first frequency F1 and a negative phase is applied to electrode Tx6. As another example, at the location of Tx7, the magnitude of the second frequency F2 with negative phase is maximized, as shown by curve 814*b* and the magnitude of the first frequency F1 is minimized (e.g., approximately 0), as shown by curve 814*a* because a drive signal with the second frequency F2 and a negative phase is applied to electrode Tx7.

In some examples, due to the non-linearity of the stylus 800 (e.g., because the stylus 800 includes diode 804 coupled to stylus tip 802), the sensed signal will include frequency content at the second harmonic of both the first frequency F1 and the second frequency F2. Moreover, in some examples, the sensed signal includes frequency content at a frequency equal to the sum F1+F2. The stylus signal may also include frequency content at a frequency equal to the difference F1−F2, but this frequency may be so low compared to the other frequencies output by the stylus 800 that it is approximately a DC offset of the stylus signal. The sensed stylus signal can be processed by the electronic device (e.g., using one or more DSPs of receiver circuitry R 710*b* illustrated in FIG. 7) a plurality of filters configured to determine the relative magnitudes of the frequency content at 2F1, 2F2, and F1+F2. In some examples, the electronic device can perform further processing of the received stylus signal to mitigate noise present in the system to improve the accuracy of the estimate of the stylus' location. As described above, for example, the electronic device can measure noise present in the drive signals (if any) and remove components of the sensed signal caused by noise. In this example, noise in the drive signal at a frequency of 2F1, 2F2, and/or F1+F2 can be detected and removed from the sensed signal to remove components of the signal at these frequencies that were present in the drive signal, as opposed to being produced by the non-linearity of the stylus 800. Other noise removal techniques are possible and can be applied to the drive signal or to the sense signal either before or after estimating the coarse, fine, and/or absolute location of the stylus.

Returning to FIG. 8, in some examples, because the relative magnitude of each respective drive signal varies based on the distance of the stylus 800 from the drive electrode being driven with the respective drive signal, the frequency content of the sense signal can be used to determine the location of the stylus 800 along the axis of the drive electrodes (e.g., along the columns shown in FIG. 8). For example, the expected magnitude of frequency content at 2F1 is illustrated by curve 820a, the expected magnitude of frequency content at 2F2 is illustrated by curve 820b, and the expected magnitude of frequency content at F1+F2 is illustrated by curve 820c.

For example, because the stylus 800 is closest to Tx5 in FIG. 8, the signal sensed by rows Rx6-8 will have a higher magnitude of frequency content at 2F2, compared to the relative magnitudes of the frequency content at 2F1 and F1+F2. As another example, if the horizontal position of the stylus 800 was between Tx6 and Tx7, the magnitude of the frequency content at F1+F2 would be higher than the magnitude of the frequency content at 2F1 and 2F2. In this example, the electronic device can distinguish the location of stylus 800 as being between Tx6 and Tx7 instead of being at a location between Tx6 and Tx5 or a location between Tx7 and Tx8 based on the phase of the F1+F2 content being positive, as shown by curve 820c at the location between Tx7 and Tx8.

Thus, in some examples, the electronic device is able to determine information about the horizontal position of the stylus 800 along the axis of the drive electrodes T based on the frequency content of the received stylus signal. In some examples, the determination of the stylus based on frequency content can be more precise than the determination of the location of the stylus based on comparing the overall magnitude of the sensed signals 818 (e.g., based on a projection scan), as was done to determine the vertical location of the stylus. That being said, in some examples, the touch-sensitive surface 810 of the electronic device can include more electrodes than the number of electrodes pictured and the drive signal pattern of F1+, F2+, F1−, F2− can be repeated as many times as needed to drive all drive electrodes of the panel simultaneously. Thus, multiple locations along the axis of the drive lines (e.g., the horizontal axis, in this example) can correspond to the same frequency content of the sensed signal. For example, the frequency content of 2F1 is maximized if the stylus 800 is located overlapping Tx4 or Tx8. The coarse determination of location along the axis of the sense lines (e.g., the vertical axis, in this example) based on projection scan can be used to determine which two rows the stylus 800 is closest to and the fine determination of location along the axis of the drive lines based on frequency content can be used to determine the more precise location of the stylus relative to the two closest electrodes, for example.

In order to determine coarse and fine location in both axis, in some examples, the electronic device can perform a first stylus scan in which the column electrodes are driven and the row electrodes are sensed (as shown in FIG. 8) and a second stylus scan in which the row electrodes are driven and the column electrodes are sensed. Thus, during the first stylus scan, the coarse location can be determined along the vertical axis and the relative fine location can be determined along the horizontal axis, for example. In this example, during the second stylus scan, the coarse location can be determined along the horizontal axis and the relative fine location can be determined along the vertical axis. Moreover, in some examples, these stylus scans can be time-multiplexed with other touch detection scans, such as a self- or mutual capacitance scan using one drive frequency for detecting passive conductive objects that do not include non-linear components (e.g., fingers, other passive styluses) or another scan in which the rows and the columns are all sensed to detect an active stylus that includes a battery or other power system to generate an active stylus signal.

Thus, as described above with reference to FIGS. 5-8, the electronic device is able to locate the stylus on the touch sensitive surface based on the magnitudes and frequency content of the stylus signals received at the touch electrodes of the touch-sensitive surface. In some examples, there can be variations in the sensed stylus data due to factors such as the amount of wear on the tip of the stylus, the temperature of the environment of the stylus and touch sensitive surface, and/or the tilt of the stylus relative to the touch sensitive surface. Thus, in some examples, performing a simple comparison of the magnitude of the sensed stylus signals to one or more thresholds can be insufficient for accurately determining whether or not the stylus is in contact with the touch sensitive surface.

In some situations, improving the accuracy of determining whether or not the stylus is in contact with the touch sensitive surface can impact the user experience of using the stylus to provide input at the touch sensitive surface. For example, if the electronic device incorrectly classifies touch data as indicative of the stylus touching the touch sensitive surface while the stylus is not actually touching the touch sensitive surface, the electronic device can perform operations not intended by the user in response to the stylus data. For example, while the user is using the stylus to draw or write, the electronic device can create extraneous markings at locations at which the electronic device detects the stylus touching the touch sensitive surface when the stylus is not actually touching the touch sensitive surface. Likewise, for example, if the electronic device incorrectly classifies touch data as indicative of the stylus not touching the touch sensitive surface while the stylus is actually touching the touch sensitive surface, the electronic device can forgo performing operations intended by the user in response to the stylus data. For example, while the user is using the stylus to draw or write, the electronic device can create gaps in the virtual drawing and/or writing at locations at which the electronic device detects the stylus not touching the touch sensitive surface when the stylus is actually touching the touch sensitive surface or is within a close threshold (e.g., 1, 2, 3, 4, 5, etc. millimeters) of touching the touch sensitive surface at which the user intends to touch the touch sensitive surface with the stylus.

In some examples, the angle of the stylus relative to the touch sensitive surface can affect the magnitude of the stylus signal at the centroid, which can be a source of error in estimating whether or not the stylus is in contact with the touch sensitive surface by comparing the magnitude of the stylus signal to one or more thresholds. In some examples, however, the stylus tilt can also affect the overall shape of the stylus signal across several adjacent touch electrodes. For example, touch electrodes towards which the stylus is tilted can sense a higher signal magnitude than touch electrodes away from the tilt of the stylus. In some examples, as will be described in more detail below, machine learning techniques, such as convolutional neural networks, can be used to analyze the sensed stylus data to estimate the distance of the stylus from the touch sensitive surface. The machine learning techniques can be robust to changes in temperature, stylus wear and tear, and the orientation of the stylus relative to the touch sensitive surface (e.g., by training the machine learning algorithm using data that includes these sources of error).

Figure 9:
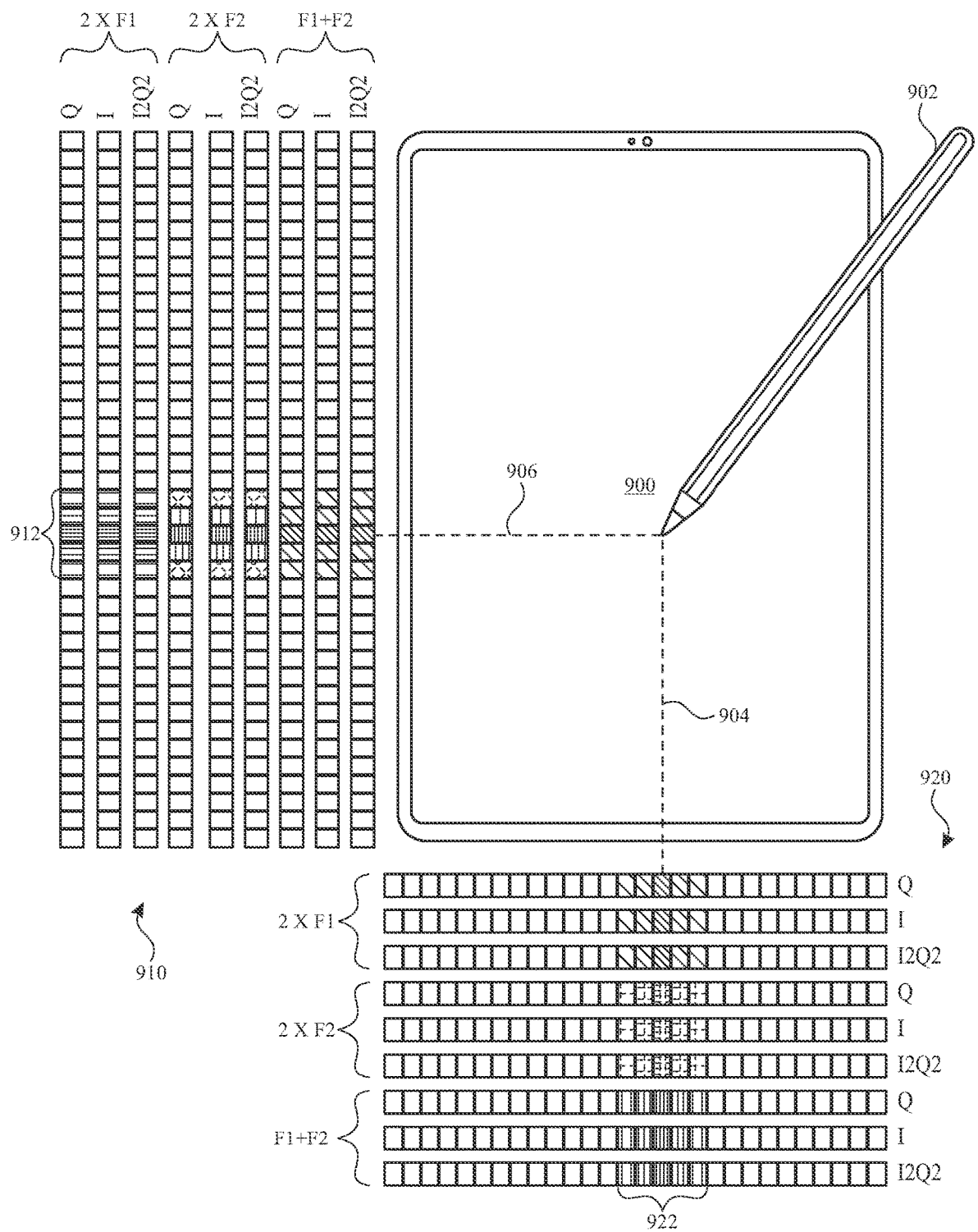
FIG. 9 illustrates collection of stylus data and at a touch sensitive surface according to some examples of the disclosure.

In some examples, the machine learning algorithm can estimate the distance between the stylus and the touch sensitive surface (e.g., "z-height") based on stylus data collected at a subset of touch electrodes of the touch sensitive surface that are closest to the estimated position of the stylus. FIG. 9 illustrates collection of stylus data 910 and 920 at a touch sensitive surface 900 according to some examples of the disclosure. In the example illustrated in FIG. 9, the stylus 902 can be in contact with or hovering over the touch sensitive surface 900 at a location corresponding to a respective row 906 and respective column 904 of the touch sensitive surface.

In some examples, the stylus data 910 sensed at the row electrodes of the touch sensitive surface 900 and the stylus data 920 sensed at the column electrodes of the touch sensitive surface can each include signals having a frequency of 2F1 (e.g., the second harmonic of one of the drive frequencies F1), signals having a frequency 2F2 (e.g., the second harmonic of one of the drive frequencies F2) and signals having a frequency of F1+F2 (e.g., the sum of both drive frequencies). In some examples, the touch sensitive surface 900 can sense stylus signals that are in phase (e.g., I), quadrature signals (e.g., Q, out of phase by 90°), and signals representing the magnitude (e.g., $I^2Q^2$) for each sensed frequency.

In some examples, the electronic device can estimate the distance of the stylus 902 from the touch sensitive surface 900 (e.g., z-height) using a subset 912 and 922 of stylus signals sensed by touch electronic device of the touch sensitive surface that are closest to the location of the stylus at the touch sensitive surface. For example, the position of the stylus 902 can be estimated based on the touch data 910 and 920 as described above with reference to FIG. 8 to identify the subset 912 and 922 of stylus data collected by touch electrodes closest to the location of the stylus 902 at the touch sensitive surface 900. In some examples, the subset 912 and 922 of stylus data can be identified using the fine location of the stylus based on the magnitude and frequency content of the stylus signals as described above with reference to FIG. 8. In some examples, the subset 912 and 922 of stylus data can be identified using the coarse location of the stylus based only on the magnitude of the stylus signals.

As shown in FIG. 9, the electronic device can identify a subset 912 of the stylus data 910 collected by the row electrodes of the touch sensitive surface 900 that are closest to the row 906 of the touch sensitive surface at which the stylus 902 is located, for example. The subset 912 of stylus data 910 collected by the row electrodes can include stylus data collected by row 906, for example. As another example, the electronic device can identify a subset 922 of the stylus data 920 collected by the column electrodes of the touch sensitive surface 900 that are closest to the column 904 of the touch sensitive surface at which the stylus 902 is located. The subset 922 of stylus data 920 collected by the column electrodes can include stylus data collected by column 904. In some examples, the subset 912 and 922 of the stylus data 910 and 920 can be provided to a neural network configured to estimate the distance between the stylus 902 and the touch sensitive surface 900.

Figure 10:
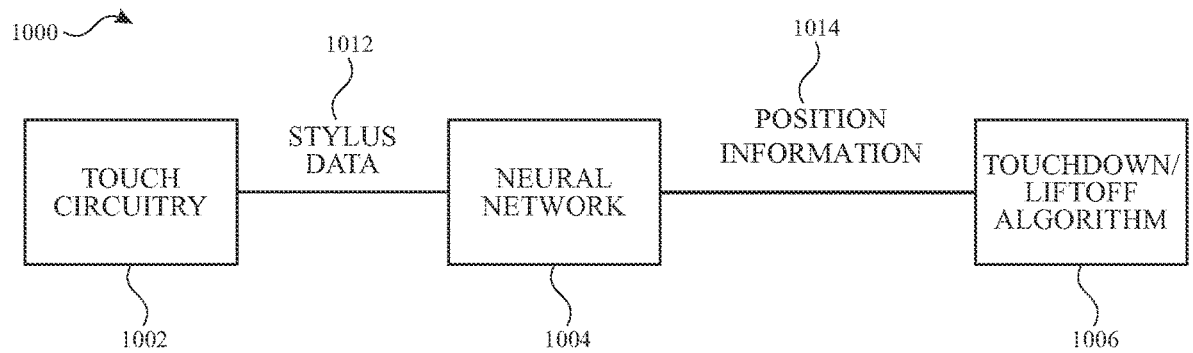
FIG. 10 illustrates a block diagram of a system for estimating stylus touchdown and liftoff from a touch sensitive surface according to some examples of the disclosure.

FIG. 10 illustrates a block diagram 1000 of a system for estimating stylus touchdown and liftoff from a touch sensitive surface according to some examples of the disclosure. The examples illustrated in FIG. 10 can be combined with one or more examples described above with reference to FIGS. 1A-9.

In some examples, block diagram 1000 includes touch circuitry 1002, neural network 1004, and a touchdown and liftoff algorithm 1006. In some examples, touch circuitry 1002 can include the touch circuitry described above with reference to FIGS. 2-5 and 7-9. For example, touch circuitry 1002 can include touch electrodes that apply one or more drive signals and receive one or more stylus signals, drive circuitry that generates the drive signals, sense circuitry that senses the received stylus signals, and the like. In some examples, neural network 1004 can be a convolutional neural network or other machine learning algorithm trained to estimate the distance between a stylus and a touch sensitive surface. For example, the neural network 1004 can include a plurality of fully or partially connected layers of nodes. The neural network 1004 can be trained using stylus data associated with the known distance between the stylus and the touch sensitive surface while the data was collected. The neural network 1004 can be stored on a non-transitory computer readable storage medium and can be executed by one or more processors of an electronic device in communication with touch circuitry 1002 and the touchdown and liftoff algorithm 1006, for example. Likewise, in some examples, the touchdown and liftoff algorithm 1006 can also be stored on a non-transitory computer readable storage medium and can be executed by one or more processors of an electronic device in communication with neural network 1004 (and, optionally, touch circuitry 1002). The touchdown and liftoff algorithm 1006 will be described in more detail below with reference to FIGS. 11-12B.

As shown in FIG. 10, in some examples, the touch circuitry 1002 can be in communication with the neural network 1004. The touch circuitry 1002 can provide the neural network 1004 with stylus data 1012, for example. In some examples, the stylus data 1012 can be a subset of the stylus data that is sensed by the touch electrodes closest to the location of the stylus at the touch sensitive surface (e.g., subsets 912 and 922 of stylus data 910 and 920 described above with reference to FIG. 9). The stylus data 1012 can include stylus data having multiple frequencies (e.g., 2F1, 2F2, F1+F2), including multiple phases (e.g., in-phase, quadrature) and a magnitude signal (e.g., $I^2Q^2$) for each frequency.

In some examples, the neural network 1004 can be in communication with the touchdown and liftoff algorithm 1006. The neural network 1004 can provide the touchdown and liftoff algorithm 1006 with position information 1014 (e.g., including z-height) of the stylus in some examples. For example, the position information 1014 of the stylus can be the distance between a tip of the stylus and the touch sensitive surface estimated by the neural network 1004. In some examples, the neural network 1004 can be robust to a variety of conditions that can cause error in estimating touchdown and liftoff of the stylus based on z-metrics such as signal density, signal magnitude, and the like. For example, the neural network 1004 can be trained using stylus data encompassing a variety of ambient temperatures, angles of the stylus relative to the touch sensitive surface, stylus tip wear conditions, and other factors. The stylus training data can include stylus data associated with the known z-height of the stylus while the respective data was collected, for example. In some examples, the neural network 1004 can be tested using a set of test data that also includes stylus data collected across a variety of the conditions described above associated with the known z-height of the stylus while the data was collected.

Thus, the touchdown and liftoff algorithm 1006 can determine whether or not the stylus is touching or not touching the touch sensitive surface based on the position information 1014 (e.g., including z-height) of the stylus estimated by neural network 1004. As described above, the neural network 1004 can be robust to variations in conditions that can cause errors when estimating the z-height of the stylus or the touchdown or liftoff state of the stylus based on other z metrics, such as z-density, z-total, z-magnitude, and the like.

Figure 11:
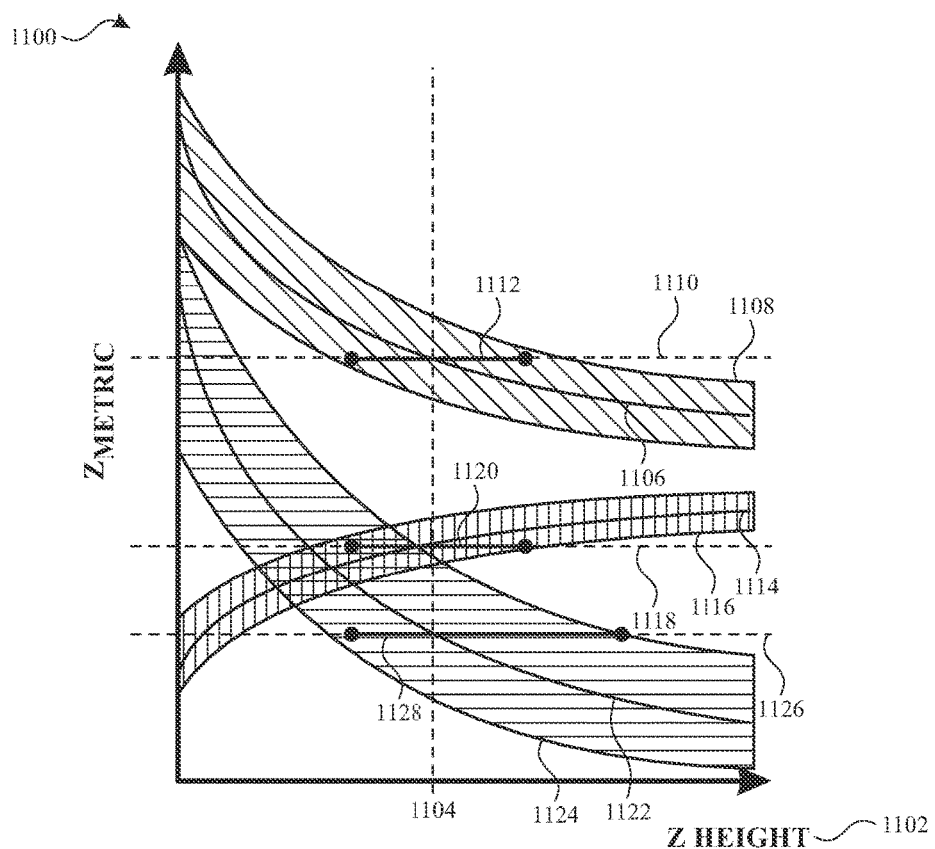
FIG. 11 is a graph illustrating the relationships between various z metrics and the z-height of the stylus in accordance with some examples of the disclosure.

FIG. 11 is a graph 1100 illustrating the relationships between various z metrics 1106, 1114, and 1122 and the z-height 1104 of the stylus in accordance with some examples of the disclosure. In some examples, z metrics 1106, 1115, and 1122 can include metrics such as z-density (e.g., the average signal magnitude of a region of the touch sensitive surface with which the stylus is in contact), z-total (e.g., the total signal of a region of the touch sensitive surface with which the stylus is in contact or the total signal of the entire touch sensitive surface), z-magnitude (e.g., the maximum signal at a single touch electrode, the maximum signal for each axis of touch electrodes), z-inverse (e.g., sensed signal strength/magnitude that is greater when the z-height (e.g., distance between stylus and touch sensitive surface) is smaller) and the like.

Graph 1100 can illustrate exemplary values of three z metrics 1106, 1115, and 1122 for a range of z-heights 1102, for example. In some examples, the correlation between the z metrics 1106, 1115, and 1122 and z-height 1102 may not be one-to-one. In some examples, a range of values of each z metric 1106, 1115, and 1122 can correspond to a range of z-heights 1102. Thus, graph 1100 illustrates the errors 1108, 1116, and 1124 of z metrics 1106, 1114, and 1122, respectively. For example, for a respective z-height 1104, metric 1106 can have a value illustrated by range 1112, metric 1114 can have a value illustrated by range 1120, and metric 1122 can have a value illustrated by range 1128. In some examples, the range of values that may correspond to the respective z-height 1104 can make it difficult to estimate z-height 1102 based on one z-metric alone. Moreover, as illustrated by graph 1100, the relationships between z height and metrics 1105, 1114, and 1122 can be non-linear. In some examples, rather than using a single one of metrics 1106, 1114, or 1122 to estimate z-height 1102, a neural network 1004 can be used to estimate z-height 1102.

Figure 12A:
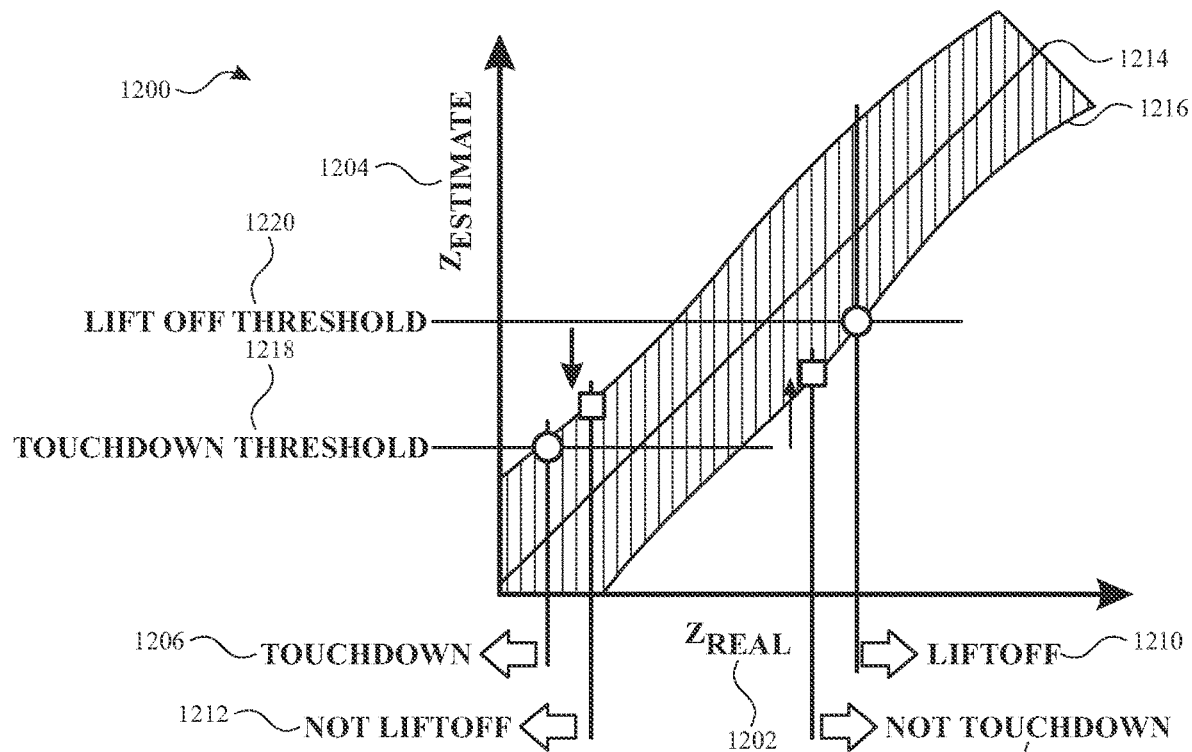
FIGS. 12A-12B illustrate exemplary graphs of estimated z-height versus real z-height according to some examples of the disclosure.
Figure 12B:
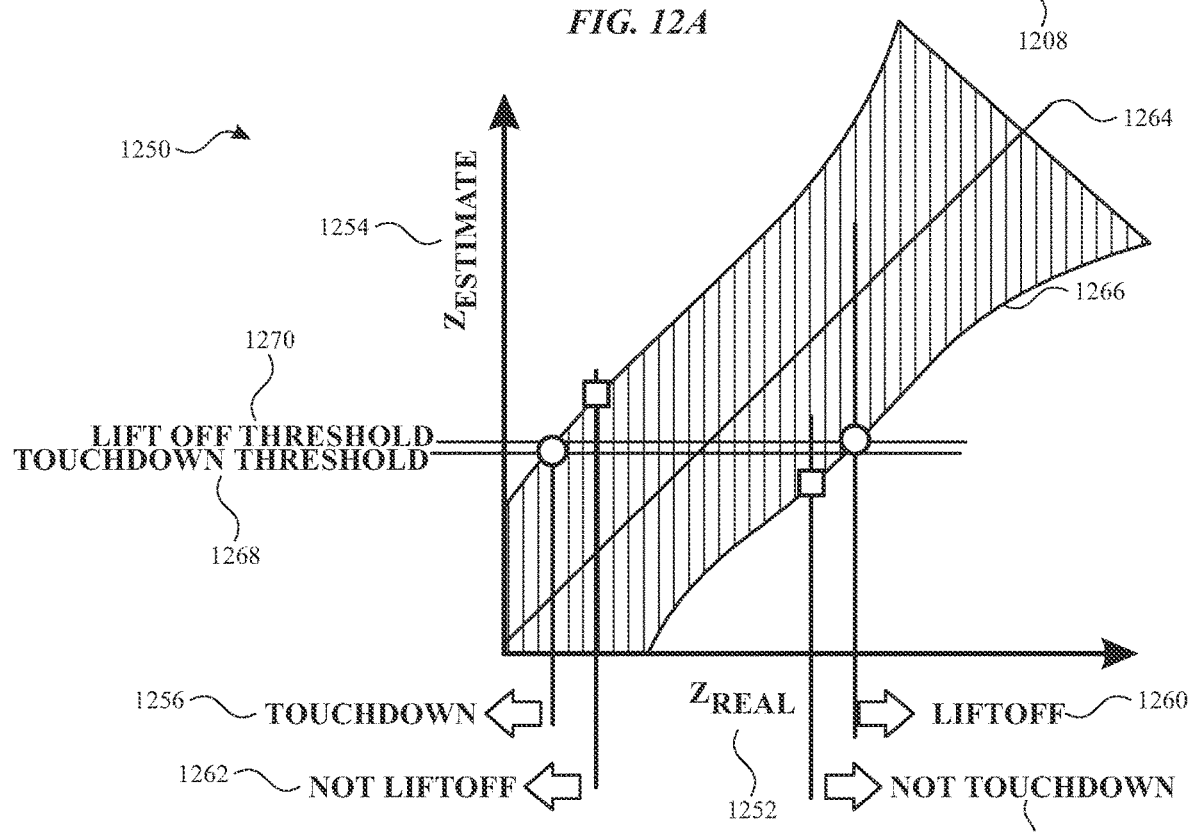

Even when using a neural network 1005 to estimate z-height, in some examples, the estimated z-height can have a margin of error. FIGS. 12A-12B illustrate exemplary graphs 1200 and 1250 of estimated z-height 1204 and 1254 versus real z-height 1202 and 1252 according to some examples of the disclosure. For example, the graph 1200 illustrated in FIG. 12A can illustrate an estimated z-height 1204 with a smaller margin of error 1216 than the margin of error 1266 of the estimated z-height 1254 of graph 1250 in FIG. 12B. In some examples, graphs 1200 and 1250 can illustrate exemplary touchdown and liftoff algorithms 1006 used to determine whether or not the stylus is in contact with the touch sensitive surface based on the estimated position information 1014 (e.g., including z-height) provided by neural network 1004.

Referring to FIG. 12A, in some examples, the estimated z-height 1204 can have a margin of error 1216 that deviates from ideal estimation 1214. Ideal estimation 1214 can correspond to an estimated z-height 1204 that matches the real z-height 1202. Graph 1200 can include a touchdown threshold 1206 corresponding to the real z-height 1202 below which the stylus can be determined to be in contact with the touch sensitive surface and liftoff threshold 1210 above which the stylus can be determined not to be in contact with the touch sensitive surface, for example. In some examples, the touchdown and liftoff algorithm can also identify an upper touchdown threshold 1208 corresponding to the real z-height 1202 above which the stylus can be determined not to be in contact with the touch sensitive surface and a lower liftoff threshold 1212 below which the stylus can be determined to be in contact with the touch-sensitive surface. In some examples, the lower liftoff threshold 1212 and the upper touchdown threshold 1208 can be determined based on the margins of error of the estimation of the real z-height 1202. For example, the upper touchdown threshold 1208 can correspond to the highest z-real 1202 value that could correspond to an estimated z-height 1204 at touchdown threshold 1218. As another example, the lower liftoff threshold 1212 can correspond to the lowest real z-height 1202 that could correspond to an estimated z-height 1204 at the liftoff threshold 1220. In some examples, including upper touchdown threshold 1208 and lower liftoff threshold 1212 can improve the hysteresis of the touchdown and liftoff algorithm.

As an example, graph 1200 can include a liftoff threshold 1220 corresponding to an estimated z height 1204 above which the stylus can be determined not to be in contact with the touch sensitive display and a touchdown threshold 1218 corresponding to an estimated z-height 1204 below which the stylus can be determined to be in contact with the touch sensitive surface. In some examples, the estimated z-height touchdown threshold 1218 is set at the highest estimated z-height that could correspond to the real z-height 1202 of the real z-height touchdown threshold 1206, as indicated by error 1216. Thus, for example, the relationship between the real z-height touchdown threshold 1206 and the estimated z-height touchdown threshold 1218 can avoid false negatives (e.g., avoid determining the stylus is not in contact with the touch sensitive surface when it is indeed in contact with the touch sensitive surface). In some examples, the estimated z-height liftoff threshold 1220 is set at the lowest estimated z-height that could correspond to the real z-height 1202 of the real z-height liftoff threshold 1210, as indicated by error 1216. Thus, for example, the relationship between the real z-height liftoff threshold 1210 and the estimated z-height touchdown liftoff threshold 1220 can avoid false negatives (e.g., avoid determining the stylus is in contact with the touch sensitive surface when it is indeed not in contact with the touch sensitive surface).

As shown in FIG. 12A, the margin of error 1216 of the estimated z-height 1204 is narrow enough that the estimated liftoff threshold 1220 is above the estimated touchdown threshold 1218 and the estimated z-heights corresponding to the lower liftoff threshold 1212 and the upper touchdown threshold 1208 are between the estimated liftoff threshold 1220 and the estimated touchdown threshold 1218, for example. In some examples, this arrangement can improve the accuracy of the touchdown and liftoff algorithm and improve the user experience by more accurately determining when the stylus is in contact with the touch sensitive device (e.g., touchdown) and when the stylus is not in contact with the touch sensitive device (e.g., liftoff).

Referring to FIG. 12B, in some examples, the estimated z-height 1254 can have a margin of error 1266 that deviates from ideal estimation 1264. Ideal estimation 1264 can correspond to an estimated z-height 1254 that matches the real z-height 1252. In some examples, the margin of error 1266 of graph 1250 can be greater than the margin of error 1216 of graph 1200.

Graph 1250 can include a touchdown threshold 1256 corresponding to the real z-height 1252 below which the stylus can be determined to be in contact with the touch sensitive surface and liftoff threshold 1260 above which the stylus can be determined not to be in contact with the touch sensitive surface, for example. In some examples, threshold 1256 in FIG. 12B can be the same as threshold 1206 in FIG. 12A and threshold 1260 in FIG. 12B can be the same as the threshold 1210 in FIG. 12A (e.g., the touchdown and liftoff thresholds can be predetermined independent from the performance of neural network 1004) In some examples, the touchdown and liftoff algorithm also identifies an upper touchdown threshold 1258 corresponding to the real z-height 1252 above which the stylus can be determined not to be in contact with the touch sensitive surface and a lower liftoff threshold 1262 below which the stylus can be determined to be in contact with the touch-sensitive surface. In some examples, threshold 1262 in FIG. 12B can be the same as the threshold 1212 in FIG. 12A and threshold 1258 in FIG. 12B can be the same as threshold 1208 in FIG. 12A (e.g., the upper touchdown threshold and lower liftoff threshold can be predetermined independent from the performance of neural network 1004). In some examples, including upper touchdown threshold 1258 and lower liftoff threshold 1262 can improve the hysteresis of the touchdown and liftoff algorithm.

As an example, graph 1250 can include a liftoff threshold 1270 corresponding to an estimated z height 1254 above which the stylus can be determined not to be in contact with the touch sensitive display and a touchdown threshold 1268 corresponding to an estimated z-height 1254 below which the stylus can be determined to be in contact with the touch sensitive surface. In some examples, the estimated z-height touchdown threshold 1268 is set at the highest estimated z-height that could correspond to the real z-height 1252 of the real z-height touchdown threshold 1256, as indicated by error 1266. Thus, for example, the relationship between the real z-height touchdown threshold 1256 and the estimated z-height touchdown threshold 1268 can avoid false negatives (e.g., avoid determining the stylus is not in contact with the touch sensitive surface when it is indeed in contact with the touch sensitive surface). In some examples, the estimated z-height liftoff threshold 1270 is set at the lowest estimated z-height that could correspond to the real z-height 1252 of the real z-height liftoff threshold 1260, as indicated by error 1266. Thus, for example, the relationship between the real z-height liftoff threshold 1260 and the estimated z-height touchdown liftoff threshold 1270 can avoid false negatives (e.g., avoid determining the stylus is in contact with the touch sensitive surface when it is indeed not in contact with the touch sensitive surface).

As shown in FIG. 12B, the margin of error 1266 of the estimated z-height 1254 is narrow enough that the estimated liftoff threshold 1270 is above the estimated touchdown threshold 1268, but the estimated z-height corresponding to the lower liftoff threshold 1262 is greater than the estimated liftoff threshold 1270 and the estimated z-height corresponding to upper touchdown threshold 1508 is less than estimated touchdown threshold 1268, for example. In some examples, this arrangement an insufficient margin between the estimated liftoff threshold 1270 and the estimated touchdown threshold 1268. Thus, it would be preferable to improve the margin of error 1266 of the estimated z-height 1254 (e.g., by improving the performance of neural network 1004 or reducing noise in the stylus data). In some examples, the touchdown and liftoff algorithm characterized by chart 1200 can be preferable to the touchdown and liftoff algorithm characterized by chart 1250.

Figure 13:
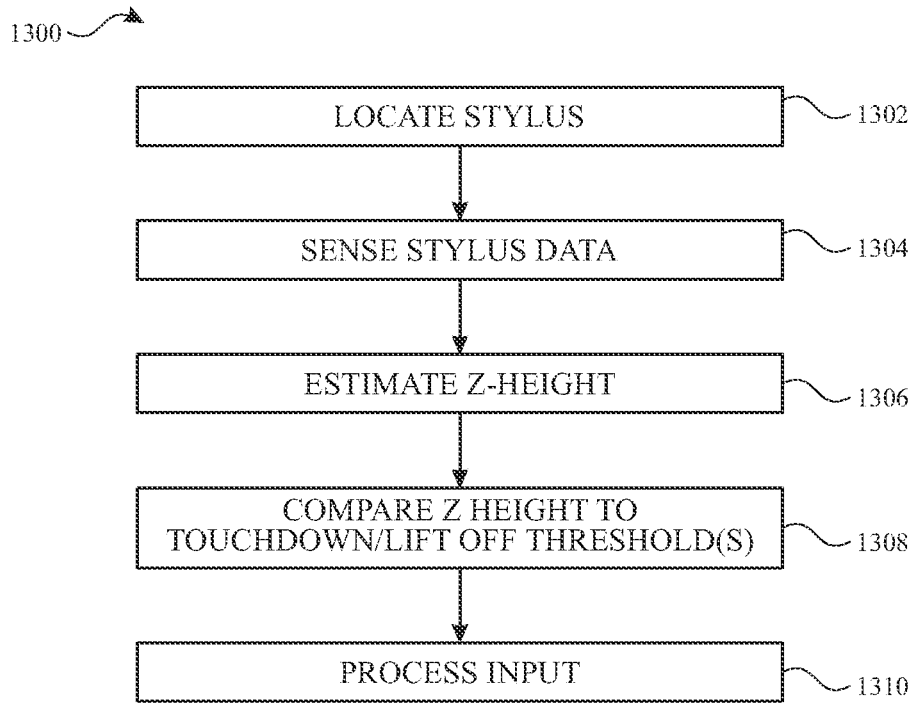
FIG. 13 illustrates a method of processing stylus data according to some examples of the disclosure.

Thus, in some examples, an electronic device is able to determine stylus liftoff and touchdown by estimating the z-height of the stylus with a neural network based on a subset of sensed stylus data. FIG. 13 illustrates a method 1300 of processing stylus data according to some examples of the disclosure. The examples described below with reference to FIG. 13 can be combined with one or more examples described above with reference to FIGS. 1A-12B. In some examples, method 1300 can be stored on a non-transitory computer-readable storage medium and can be executed by an electronic device including one or more processors.

At 1302, an electronic device can locate the stylus at a touch sensitive surface, such as according to one or more examples described above with reference to FIGS. 1A-8. At 1304, the electronic device can identify a subset of stylus data corresponding to the location of the stylus, such as according to one or more examples described above with reference to FIGS. 8-9. At 1306, the electronic device can estimate the z-height of the stylus (e.g., using a neural network), such as according to one or more examples described above with reference to FIGS. 9-11. At 1308, the electronic device can compare the estimated z-height to one or more touchdown and liftoff thresholds to determine whether or not the stylus is in contact with the touch sensitive surface, such as according to one or more examples described above with reference to FIGS. 12A-12B. At 1310, the electronic device can process the stylus input, which can include performing an operation in accordance with the stylus input (e.g., making a selection, displaying digital ink, etc. in response to stylus touchdown) or forgoing or ceasing an operation in accordance with the stylus input (e.g., forgoing a selection, initiating a process associated with touchdown, ceasing to add digital ink, etc. in response to stylus liftoff).

In some examples, estimation of the (x, y) position of the stylus at the touch sensitive surface can be enhanced using machine learning techniques. For example, machine learning techniques can estimate the (x, y) position of the tip of the stylus within a 100 micrometer margin of error, whereas other techniques may have a larger margin of error.

As described above with reference to FIG. 8, in some examples, the coarse location of the stylus 800 (e.g., the touch electrodes closest to the position of the stylus tip) can be identified based on the magnitudes of the touch signals. For example, the electronic device can identify the approximate position of the stylus 800 along a vertical axis by identifying the centroid of touch signal 818. In FIG. 8, for example, the stylus 800 is closest to the Rx7 electrode along the vertical axis. In some examples, the electronic device can repeat stylus sensing for the horizontal axis to similarly identify the approximate position of the stylus 800 tip along the horizontal axis. For example, if the stylus 800 is at the position illustrated in FIG. 8, the stylus 800 is closest to the Tx5 electrode along the horizontal axis.

In some examples, the electronic device can perform further processing on the received touch signals at the one or more closest touch electrodes to the stylus 800 tip to identify a fine location of the stylus 800 tip. As described above with reference to FIG. 8, due to the differences in phases and frequencies of the drive signals applied at each vertical electrode (e.g., representing different horizontal positions along the touch screen), performing additional analysis of the signal received at, for example, the Rx7 electrode (e.g., and one or more additional row electrodes proximate to the Rx7 electrode) can enable the electronic device to obtain an estimation of the fine location of the stylus 800 tip along the horizontal axis. In some embodiments, machine learning techniques can be used to estimate the fine location of the stylus. For example, the machine learning algorithm can use touch data sensed at the row electrodes to obtain a fine position estimation along the column electrodes and can use touch data sensed at column electrodes to obtain a fine position estimation along the row electrodes. In some examples, the machine learning algorithm can use the stylus data at the rows and columns to estimate the fine (x, y) position of the stylus, estimating the fine position along both dimensions using touch data from both dimensions.

Referring to FIG. 9, in some examples, the electronic device provides a subset of touch data to the machine learning algorithm that estimates the (x, y) position of the stylus. For example, in a manner similar to the manner described above for the machine learning algorithm that estimates the z-height of the stylus tip, the electronic device can select a subset 912 of touch data 910 in a first direction and a subset 922 of touch data 920 in a second direction as inputs to the machine learning algorithm that estimates the (x, y) position of the stylus tip at the touch sensitive surface 900. In some examples, the stylus data 910 and 920 can include stylus data having a plurality of frequencies, such as $2xF_1$, $2xF_2$, and $F_1+F_2$. In some examples, the stylus data 910 and 920 can include, signals that are in phase (e.g., I), quadrature signals (e.g., Q, out of phase by 90°), and signals representing the magnitude (e.g., $I^2Q^2$) for each sensed frequency.

In some examples, as shown in FIG. 9, data from five touch electrodes in each direction can be provided to the machine learning algorithm that can estimate the (x, y) position of the stylus. In some examples, the electronic device can use data from a different number of touch electrodes for the machine learning algorithm that can estimate the (x, y) position of the stylus and/or the machine learning algorithm that can estimate the z-height of the stylus. In some examples, the electronic device can use data from different numbers of touch electrodes for the machine learning algorithm that estimates stylus tip z-height versus the machine learning algorithm that estimates the (x, y) position of the stylus. Reducing the amount of touch data provided to one or more of the machine learning algorithms by reducing the number of touch electrodes used can reduce the complexity of the one or more algorithms, which can conserve power, for example. In some examples, the electronic device can first perform the stylus tip height estimation and then only estimate the stylus tip position if the stylus tip height algorithm estimates that the stylus tip height corresponds to the stylus tip being in contact with the touch sensitive surface. In some examples, both algorithms are performed for (e.g., multiple, all, etc.) frames of touch data.

Referring to FIG. 5, in some examples, the machine learning algorithm that can estimate the (x, y) position of the stylus tip can also estimate the tilt 518 angle and azimuth angle 522 of the stylus relative to the touch sensitive surface. In some examples, the position, tilt, and azimuth algorithm can be trained using touch data associated with known stylus positions, tilt, and azimuth, thereby enabling the algorithm to estimate these figures together. In some examples, testing data including stylus data associated with known position, tilt, and azimuth can be used to test, improve, and verify the algorithm prior to the algorithm being deployed.

In some examples, system 1000 in FIG. 10 can be used to estimate the (x, y) location of the tip of the stylus at the touch sensitive surface. For example, touch circuitry 1002 can sense stylus signals 1012 as described above with reference to FIGS. 7-9. In some examples, the stylus signals 1012 can be provided to a neural network 1004 that uses one or more machine learning techniques, such as neural networks, to output an estimate of stylus position information 1014, including the (x, y) location of the stylus tip at the touch sensitive surface and/or tilt and/or azimuth angles of the stylus. In some examples, the neural network 1004 that estimates the (x, y) location of the stylus is different from the neural network that estimates the z-height of the stylus tip. In some examples, the same neural network can be used to estimate the z-height and the (x, y) location.

Figure 14:
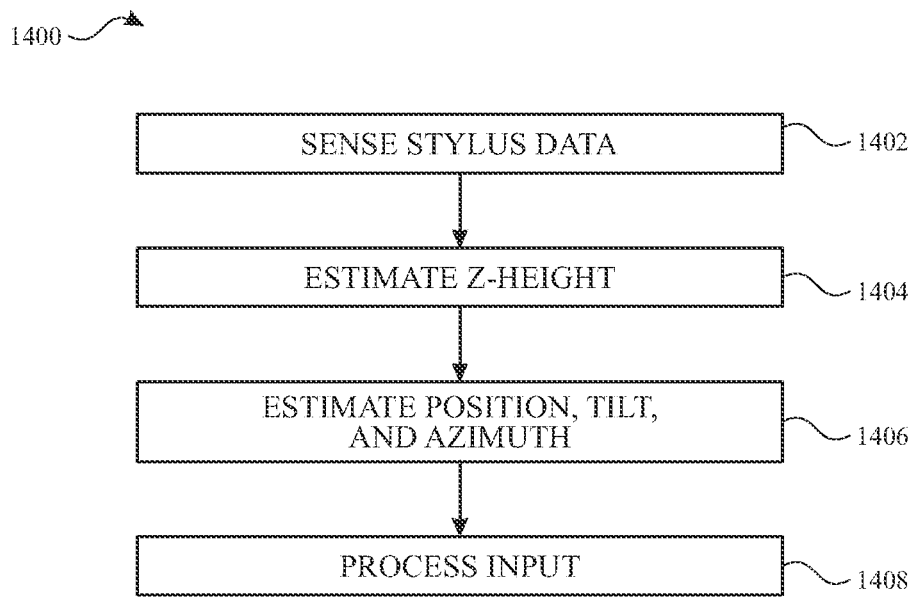
FIG. 14 illustrates an exemplary method of estimating the position of the stylus tip using machine learning techniques according to some examples of the disclosure.

FIG. 14 illustrates an exemplary method 1400 of estimating the position of the stylus tip using machine learning techniques according to some examples of the disclosure. In some examples, the machine learning techniques can include neural networks, such as convolutional neural networks. In some examples, method 1400 can be performed at an electronic device including one or more processors. In some examples, method 1400 can be stored on a non-transitory computer readable storage medium. In some examples, method 1400 can be performed for each frame of stylus data. In some examples, a frame of stylus data includes measurements from a first plurality of touch electrodes oriented along a first axis and measurements from a second plurality of touch electrodes orientated along a second axis.

In some examples, the method 1400 can include sensing 1402 stylus data at one or more touch electrodes. For example, the electronic device can use one or more examples described above with reference to FIGS. 1A-8 to sense the stylus data. In some examples, sensing the stylus data can include selecting a subset of the stylus data for processing via machine learning. For example, the electronic device can select a subset of the stylus data as described above with reference to FIG. 9. In some examples, the electronic device selects a first subset of stylus data to estimate the z-height of the stylus tip and a second subset of stylus data to estimate the (x, y) position and/or tilt and/or azimuth of the stylus. In some examples, the electronic device selects a subset of stylus data for use with both machine learning algorithms. In some examples, if the electronic device does not detect a stylus signal, the electronic device can halt method 1400 for the respective frame of stylus data. In some examples, if the electronic device detects the stylus signal, the method 1400 can proceed.

In some examples, the method 1400 can include estimating 1404 the z-height of the stylus tip. For example, the electronic device uses one or more techniques described above with reference to FIGS. 10-13. In some examples, estimating 1404 the z-height of the stylus tip can include estimating whether the stylus tip is touching the touch sensitive surface or not. In some examples, if the electronic device estimates that the stylus tip is not touching the touch sensitive surface, the electronic device can halt method 1400 for the respective frame of stylus data. In some examples, if the electronic device estimates that the stylus tip is touching the touch sensitive surface, the method 1400 can proceed. In some examples, method 1400 can proceed irrespective of whether the electronic device determines that the stylus tip is touching the touch sensitive surface or that the stylus tip is not touching the touch sensitive surface.

In some examples, the method 1400 can include estimating 1406 the (x,y) position of the stylus tip and the tilt and azimuth angles of the stylus relative to the touch sensitive surface. In some examples, the electronic device can use machine learning techniques to make these estimations. For example, the machine learning techniques can include neural networks, such as convolutional neural networks. In some examples, the electronic device provides a subset of stylus data (e.g., such as the stylus data described above with reference to FIGS. 8-9) to the machine learning algorithm that estimates the (x,y) position of the stylus tip and the tilt and azimuth angles of the stylus relative to the touch sensitive surface.

In some examples, the method 1400 can include processing 1408 the touch input in accordance with the estimated stylus tip z-height, the estimated (x,y) position of the stylus tip and the estimated tilt and azimuth angles of the stylus relative to the touch sensitive surface. For example, in accordance with a determination that the stylus tip is touching the touch sensitive surface, the electronic device can perform a function associated with the estimated (x, y) position of the stylus tip at the touch sensitive surface.

Therefore, the disclosure provides exemplary ways an electronic device can process stylus data using machine learning techniques.

Some examples of the disclosure are directed to a method, comprising at an electronic device including one or more processors that are in communication with a touch sensitive surface: applying, via drive circuitry in communication with the touch sensitive surface, drive signals to a plurality of touch electrodes of the touch sensitive surface, wherein the drive signals include first signals with a first frequency and second signals with a second frequency; sensing, via sense circuitry in communication with the touch sensitive surface, stylus signals received at the plurality of touch electrodes of the touch sensitive surface, wherein the stylus signals include first stylus signals with a third frequency and second stylus signals with a fourth frequency; estimating, based on the first stylus signals and the second stylus signals, a distance between the stylus and the touch sensitive surface; comparing the estimated distance to at least one threshold; and determining that the stylus is in contact with the touch sensitive surface when the estimated distance satisfies the at least one threshold. Additionally or alternatively, in some examples the distance between the stylus and the touch sensitive surface based on the stylus signals is estimated using a neural network. Additionally or alternatively, in some examples the method further includes, prior to sensing the stylus signals: sensing, via the sense circuitry, training stylus signals received at the plurality of touch electrodes of the touch sensitive surface; measuring respective distances between the stylus and the touch sensitive surface while the training stylus signals are being sensed; and training the neural network with the training stylus signals and the respective distances. Additionally or alternatively, in some examples the training stylus signals include first training stylus signals sensed while the stylus has a first orientation relative to the touch sensitive surface, and second training stylus signals sensed while the stylus has a second orientation relative to the touch sensitive surface. Additionally or alternatively, in some examples the first stylus signals used to estimate the distance between the stylus and the touch sensitive surface include first in-phase signals, first quadrature signals, and first magnitude signals, and the second stylus signals used to estimate the distance between the stylus and the touch sensitive surface include second in-phase signals, second quadrature signals, and second magnitude signals. Additionally or alternatively, in some examples, after sensing the stylus signals and before estimating the distance between the stylus and the touch sensitive surface: determining, based on the first stylus signals and the second stylus signals, a location of the stylus on the touch sensitive surface; and identifying a subset of the touch electrodes of the touch sensitive surface that are closest to the location of the stylus on the touch sensitive surface, wherein: the subset of touch electrodes of the touch sensitive surface received a subset of first stylus signals and a subset of second stylus signals, and estimating the distance between the stylus and the touch sensitive surface is based on the subset of first stylus signals and the subset of second stylus signals without being based on stylus signals other than the subset of first stylus signals and subset of second stylus signals. Additionally or alternatively, in some examples the touch electrodes of the touch sensitive surface include first electrodes arranged along a first axis and second electrodes arranged along a second axis, the subset of touch electrodes includes a predetermined number of first electrodes and the predetermined number of second electrodes, and the predetermined number is greater than one. Additionally or alternatively, in some examples the predetermined number is five. Additionally or alternatively, in some examples the third frequency is the second harmonic of the first frequency, the fourth frequency is the second harmonic of the second frequency, and the stylus signals further include third stylus signals having a fifth frequency that is the sum of the first frequency and the second frequency.

Some examples of the disclosure are directed to a non-transitory computer-readable storage medium storing instructions that, when executed by an electronic device with one or more processors in communication with a touch sensitive surface, causes the electronic device to perform a method comprising: applying, via drive circuitry in communication with the touch sensitive surface, drive signals to a plurality of touch electrodes of the touch sensitive surface, wherein the drive signals include first signals with a first frequency and second signals with a second frequency; sensing, via sense circuitry in communication with the touch sensitive surface, stylus signals received at the plurality of touch electrodes of the touch sensitive surface, wherein the stylus signals include first stylus signals with a third frequency and second stylus signals with a fourth frequency; estimating, based on the first stylus signals and the second stylus signals, a distance between the stylus and the touch sensitive surface; and comparing the estimated distance to at least one threshold to determine whether or not the stylus is in contact with the touch sensitive surface. Additionally or alternatively, in some examples the distance between the stylus and the touch sensitive surface based on the stylus signals is estimated using a neural network. Additionally or alternatively, in some examples the method further comprises, prior to sensing the stylus signals: sensing, via the sense circuitry, training stylus signals received at the plurality of touch electrodes of the touch sensitive surface; measuring respective distances between the stylus and the touch sensitive surface while the training stylus signals are being sensed; and training the neural network with the training stylus signals and the respective distances. Additionally or alternatively, in some examples the training stylus signals include first training stylus signals sensed while the stylus has a first orientation relative to the touch sensitive surface, and second training stylus signals sensed while the stylus has a second orientation relative to the touch sensitive surface. Additionally or alternatively, in some examples the first stylus signals used to estimate the distance between the stylus and the touch sensitive surface include first in-phase signals, first quadrature signals, and first magnitude signals, and the second stylus signals used to estimate the distance between the stylus and the touch sensitive surface include second in-phase signals, second quadrature signals, and second magnitude signals. Additionally or alternatively, in some examples the method further comprises, after sensing the stylus signals and before estimating the distance between the stylus and the touch sensitive surface: determining, based on the first stylus signals and the second stylus signals, a location of the stylus on the touch sensitive surface; and identifying a subset of the touch electrodes of the touch sensitive surface that are closest to the location of the stylus on the touch sensitive surface, wherein: the subset of touch electrodes of the touch sensitive surface received a subset of first stylus signals and a subset of second stylus signals, and estimating the distance between the stylus and the touch sensitive surface is based on the subset of first stylus signals and the subset of second stylus signals without being based on stylus signals other than the subset of first stylus signals and subset of second stylus signals. Additionally or alternatively, in some examples the third frequency is the second harmonic of the first frequency, the fourth frequency is the second harmonic of the second frequency, and the stylus signals further include third stylus signals having a fifth frequency that is the sum of the first frequency and the second frequency.

Some examples are directed to an electronic device in communication with a touch sensitive surface, the electronic device comprising: one or more processors configured to perform a method comprising: applying, via drive circuitry in communication with the touch sensitive surface, drive signals to a plurality of touch electrodes of the touch sensitive surface, wherein the drive signals include first signals with a first frequency and second signals with a second frequency; sensing, via sense circuitry in communication with the touch sensitive surface, stylus signals received at the plurality of touch electrodes of the touch sensitive surface, wherein the stylus signals include first stylus signals with a third frequency and second stylus signals with a fourth frequency; estimating, based on the first stylus signals and the second stylus signals, a distance between the stylus and the touch sensitive surface; and comparing the estimated distance to at least one threshold to determine whether or not the stylus is in contact with the touch sensitive surface. Additionally or alternatively, in some examples the distance between the stylus and the touch sensitive surface based on the stylus signals is estimated using a neural network. Additionally or alternatively, in some examples the first stylus signals used to estimate the distance between the stylus and the touch sensitive surface include first in-phase signals, first quadrature signals, and first magnitude signals, and the second stylus signals used to estimate the distance between the stylus and the touch sensitive surface include second in-phase signals, second quadrature signals, and second magnitude signals. Additionally or alternatively, in some examples the method further comprises, after sensing the stylus signals and before estimating the distance between the stylus and the touch sensitive surface: determining, based on the first stylus signals and the second stylus signals, a location of the stylus on the touch sensitive surface; and identifying a subset of the touch electrodes of the touch sensitive surface that are closest to the location of the stylus on the touch sensitive surface, wherein: the subset of touch electrodes of the touch sensitive surface received a subset of first stylus signals and a subset of second stylus signals, and estimating the distance between the stylus and the touch sensitive surface is based on the subset of first stylus signals and the subset of second stylus signals without being based on stylus signals other than the subset of first stylus signals and subset of second stylus signals.

Some examples of the disclosure relate to device in communication with a touch sensitive surface, the electronic device comprising: memory storing instructions; and or more processors configured to execute the instructions to cause the electronic device to perform a method comprising: applying, via drive circuitry coupled to the touch sensitive surface, drive signals to one or more first touch electrodes of the touch sensitive surface; sensing, via sense circuitry coupled to the touch sensitive surface, sense signals at one or more second touch electrodes of the touch sensitive surface; estimating, via a machine learning algorithm, a location of a stylus based on at least a subset of the sense signals. Additionally or alternatively, in some examples, the method further comprises: selecting at least the subset of the sense signals based on magnitudes of the sense signals. Additionally or alternatively, in some examples, herein the method further comprises: filtering the sense signals to obtain first signals having a first frequency and second signals having a second frequency different from the first frequency, wherein at least the subset of the sense signals includes the first signals and the second signals. Additionally or alternatively, in some examples, the method further comprises: filtering the sense signals to obtain first signals having a first phase and second signals having a second phase different from the first phase, wherein at least the subset of the sense signals includes the first signals and the second signals. Additionally or alternatively, in some examples, the method further comprises: estimating, via a second machine learning algorithm, a distance of the stylus from the touch sensitive surface based on at least a second subset of the sense signals; and in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance. Additionally or alternatively, in some examples, at least the subset of the sense signals are from a first subset of the second touch electrodes, and the method further comprises: estimating, via a second machine learning algorithm, a distance of the stylus from the touch sensitive surface based on at least a second subset of the sense signals sensed from a second subset of the second touch electrodes different from the first subset of the second touch electrodes. Additionally or alternatively, in some examples, the method further comprises: estimating, via the machine learning algorithm, a tilt angle of the stylus based on at least the subset of the sense signals or an azimuth angle of the stylus based on at least the subset of the sense signals. Additionally or alternatively, in some examples, an estimated location of the stylus that is estimated via the machine learning algorithm and based on at least the subset of the sense signals is within 100 micrometers of an actual location of the stylus.

Some examples of the disclosure are directed to a method comprising: at an electronic device in communication with a touch sensitive surface: applying, via drive circuitry coupled to the touch sensitive surface, drive signals to one or more first touch electrodes of the touch sensitive surface; sensing, via sense circuitry coupled to the touch sensitive surface, sense signals at one or more second touch electrodes of the touch sensitive surface; estimating, via a machine learning algorithm, a location of a stylus based on at least a subset of the sense signals. Additionally or alternatively, in some examples, the method further includes selecting at least the subset of the sense signals based on magnitudes of the sense signals. Additionally or alternatively, in some examples, the method further includes filtering the sense signals to obtain first signals having a first frequency and second signals having a second frequency different from the first frequency, wherein at least the subset of the sense signals includes the first signals and the second signals. Additionally or alternatively, in some examples, the method further includes filtering the sense signals to obtain first signals having a first phase and second signals having a second phase different from the first phase, wherein at least the subset of the sense signals includes the first signals and the second signals. Additionally or alternatively, in some examples, the method further includes estimating, via a second machine learning algorithm, a distance of the stylus from the touch sensitive surface based on at least a second subset of the sense signals; and in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance. Additionally or alternatively, in some examples, at least the subset of the sense signals are from a first subset of the second touch electrodes, and the method further comprises: estimating, via a second machine learning algorithm, a distance of the stylus from the touch sensitive surface based on at least a second subset of the sense signals sensed from a second subset of the second touch electrodes different from the first subset of the second touch electrodes. Additionally or alternatively, in some examples, the method further includes estimating, via the machine learning algorithm, a tilt angle of the stylus based on at least the subset of the sense signals or an azimuth angle of the stylus based on at least the subset of the sense signals. Additionally or alternatively, in some examples, an estimated location of the stylus that is estimated via the machine learning algorithm and based on at least the subset of the sense signals is within 100 micrometers of an actual location of the stylus.

Some examples of the disclosure relate to a non-transitory computer readable storage medium storing instructions that, when executed by an electronic device with one or more processors and in communication with a touch sensitive surface cause the electronic device to perform a method comprising: applying, via drive circuitry coupled to the touch sensitive surface, drive signals to one or more first touch electrodes of the touch sensitive surface; sensing, via sense circuitry coupled to the touch sensitive surface, sense signals at one or more second touch electrodes of the touch sensitive surface; estimating, via a machine learning algorithm, a location of a stylus based on at least a subset of the sense signals. Additionally or alternatively, in some examples, the method further comprises: selecting at least the subset of the sense signals based on magnitudes of the sense signals. Additionally or alternatively, in some examples, the method further comprises: filtering the sense signals to obtain first signals having a first frequency and second signals having a second frequency different from the first frequency, wherein at least the subset of the sense signals includes the first signals and the second signals. Additionally or alternatively, in some examples, the method further comprises: filtering the sense signals to obtain first signals having a first phase and second signals having a second phase different from the first phase, wherein at least the subset of the sense signals includes the first signals and the second signals. Additionally or alternatively, in some examples, the method further comprises: estimating, via a second machine learning algorithm, a distance of the stylus from the touch sensitive surface based on at least a second subset of the sense signals; and in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance. Additionally or alternatively, in some examples, at least the subset of the sense signals are from a first subset of the second touch electrodes, and the method further comprises: estimating, via a second machine learning algorithm, a distance of the stylus from the touch sensitive surface based on at least a second subset of the sense signals sensed from a second subset of the second touch electrodes different from the first subset of the second touch electrodes. Additionally or alternatively, in some examples, the method further comprises: estimating, via the machine learning algorithm, a tilt angle of the stylus based on at least the subset of the sense signals or an azimuth angle of the stylus based on at least the subset of the sense signals. Additionally or alternatively, in some examples, an estimated location of the stylus that is estimated via the machine learning algorithm and based on at least the subset of the sense signals is within 100 micrometers of an actual location of the stylus.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An electronic device in communication with a touch sensitive surface, the electronic device comprising:
   memory storing instructions; and
   one or more processors configured to execute the instructions to cause the electronic device to perform a method comprising:
      applying, via drive circuitry coupled to the touch sensitive surface, drive signals to one or more first touch electrodes of the touch sensitive surface;
      sensing, via sense circuitry coupled to the touch sensitive surface, sense signals at one or more second touch electrodes of the touch sensitive surface;
      estimating, via a machine learning algorithm, a location of a stylus based on at least a subset of the sense signals from a first subset of the second touch electrodes; and
      estimating, via a second machine learning algorithm, a distance of the stylus from the touch sensitive surface based on at least a second subset of the sense signals sensed from a second subset of the second touch electrodes different from the first subset of the second touch electrodes.

2. The electronic device of claim 1, wherein the method further comprises:
   selecting at least the subset of the sense signals based on magnitudes of the sense signals.

3. The electronic device of claim 1, wherein the method further comprises:
   filtering the sense signals to obtain first signals having a first frequency and second signals having a second frequency different from the first frequency, wherein at least the subset of the sense signals includes the first signals and the second signals.

4. The electronic device of claim 1, wherein the method further comprises:
filtering the sense signals to obtain first signals having a first phase and second signals having a second phase different from the first phase, wherein at least the subset of the sense signals includes the first signals and the second signals.

5. The electronic device of claim 1, wherein the method further comprises:
estimating, via a second machine learning algorithm, a distance of the stylus from the touch sensitive surface based on at least a second subset of the sense signals; and
in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance.

6. The electronic device of claim 1, wherein the method further comprises:
estimating, via the machine learning algorithm, a tilt angle of the stylus based on at least the subset of the sense signals or an azimuth angle of the stylus based on at least the subset of the sense signals.

7. The electronic device of claim 1, wherein an estimated location of the stylus that is estimated via the machine learning algorithm and based on at least the subset of the sense signals is within 100 micrometers of an actual location of the stylus.

8. A method comprising:
at an electronic device in communication with a touch sensitive surface:
applying, via drive circuitry coupled to the touch sensitive surface, drive signals to one or more first touch electrodes of the touch sensitive surface;
sensing, via sense circuitry coupled to the touch sensitive surface, sense signals at one or more second touch electrodes of the touch sensitive surface;
estimating, via a machine learning algorithm, a location of a stylus based on at least a subset of the sense signals from a first subset of the second touch electrodes; and
estimating, via a second machine learning algorithm, a distance of the stylus from the touch sensitive surface based on at least a second subset of the sense signals sensed from a second subset of the second touch electrodes different from the first subset of the second touch electrodes.

9. The method of claim 8, further comprising:
selecting at least the subset of the sense signals based on magnitudes of the sense signals.

10. The method of claim 8, further comprising:
filtering the sense signals to obtain first signals having a first frequency and second signals having a second frequency different from the first frequency, wherein at least the subset of the sense signals includes the first signals and the second signals.

11. The method of claim 8, further comprising:
filtering the sense signals to obtain first signals having a first phase and second signals having a second phase different from the first phase, wherein at least the subset of the sense signals includes the first signals and the second signals.

12. The method of claim 8, further comprising:
estimating, via a second machine learning algorithm, a distance of the stylus from the touch sensitive surface based on at least a second subset of the sense signals; and
in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance.

13. The method of claim 8, further comprising:
estimating, via the machine learning algorithm, a tilt angle of the stylus based on at least the subset of the sense signals or an azimuth angle of the stylus based on at least the subset of the sense signals.

14. The method of claim 8, wherein an estimated location of the stylus that is estimated via the machine learning algorithm and based on at least the subset of the sense signals is within 100 micrometers of an actual location of the stylus.

15. A non-transitory computer readable storage medium storing instructions that, when executed by an electronic device with one or more processors and in communication with a touch sensitive surface cause the electronic device to perform a method comprising:
applying, via drive circuitry coupled to the touch sensitive surface, drive signals to one or more first touch electrodes of the touch sensitive surface;
sensing, via sense circuitry coupled to the touch sensitive surface, sense signals at one or more second touch electrodes of the touch sensitive surface;
estimating, via a machine learning algorithm, a location of a stylus based on at least a subset of the sense signals from a first subset of the second touch electrodes; and
estimating, via a second machine learning algorithm, a distance of the stylus from the touch sensitive surface based on at least a second subset of the sense signals sensed from a second subset of the second touch electrodes different from the first subset of the second touch electrodes.

16. The non-transitory computer readable storage medium of claim 15, wherein the method further comprises:
selecting at least the subset of the sense signals based on magnitudes of the sense signals.

17. The non-transitory computer readable storage medium of claim 15, wherein the method further comprises:
filtering the sense signals to obtain first signals having a first frequency and second signals having a second frequency different from the first frequency, wherein at least the subset of the sense signals includes the first signals and the second signals.

18. The non-transitory computer readable storage medium of claim 15, wherein the method further comprises:
filtering the sense signals to obtain first signals having a first phase and second signals having a second phase different from the first phase, wherein at least the subset of the sense signals includes the first signals and the second signals.

19. The non-transitory computer readable storage medium of claim 15, wherein the method further comprises:

estimating, via a second machine learning algorithm, a distance of the stylus from the touch sensitive surface based on at least a second subset of the sense signals; and in accordance with a determination that the distance of the stylus from the touch sensitive surface exceeds a predetermined threshold distance, forgoing estimating the location of the stylus, wherein estimating the location of the stylus is in accordance with a determination that the distance of the stylus from the touch sensitive surface is less than the predetermined threshold distance.

20. The non-transitory computer readable storage medium of claim 15, wherein the method further comprises:
estimating, via the machine learning algorithm, a tilt angle of the stylus based on at least the subset of the sense signals or an azimuth angle of the stylus based on at least the subset of the sense signals.

21. The non-transitory computer readable storage medium of claim 15, wherein an estimated location of the stylus that is estimated via the machine learning algorithm and based on at least the subset of the sense signals is within 100 micrometers of an actual location of the stylus.

* * * * *